(12) United States Patent
Mege et al.

(10) Patent No.: US 8,031,788 B2
(45) Date of Patent: Oct. 4, 2011

(54) OFDM RECEPTION IN MULTI-ANTENNA MODE

(75) Inventors: Philippe Mege, Bourg la Reine (FR); Christophe Brutel, Cagnes sur Mer (FR)

(73) Assignee: EADS Secure Networks, Elancourt (FR)

( * ) Notice: Subject to any disclaimer, the term of this patent is extended or adjusted under 35 U.S.C. 154(b) by 835 days.

(21) Appl. No.: 12/088,525

(22) PCT Filed: Oct. 5, 2006

(86) PCT No.: PCT/IB2006/003396
§ 371 (c)(1), (2), (4) Date: Mar. 28, 2008

(87) PCT Pub. No.: WO2007/039823
PCT Pub. Date: Apr. 12, 2007

(65) Prior Publication Data
US 2008/0247482 A1   Oct. 9, 2008

(30) Foreign Application Priority Data
Oct. 5, 2005 (FR) .................................. 05 10196

(51) Int. Cl.
H04L 23/02  (2006.01)
H04L 27/28  (2006.01)
(52) U.S. Cl. ........................... 375/260; 370/208
(58) Field of Classification Search .................. 375/260, 375/267, 346; 370/343, 491, 208, 203
See application file for complete search history.

(56) References Cited

U.S. PATENT DOCUMENTS

| 5,812,090 | A   | * | 9/1998  | Chevalier et al. | 342/378 |
| 2005/0094738 | A1 | * | 5/2005  | Park et al.      | 375/260 |
| 2005/0135324 | A1 |   | 6/2005  | Kim et al.       |         |
| 2005/0286406 | A1 | * | 12/2005 | Jeon et al.      | 370/208 |
| 2007/0058734 | A1 | * | 3/2007  | Kao et al.       | 375/260 |
| 2009/0122900 | A1 | * | 5/2009  | Mege et al.      | 375/267 |

FOREIGN PATENT DOCUMENTS
WO  WO 03/024041  3/2003

OTHER PUBLICATIONS

Osvaldo Simeone, Yeheskel Bar-Ness, and Umberto Spagnolini "Pilot-Based Channel Estimation for OFDM Systems by Tracking the Delay-Subspace", 2004 IEEE.*

* cited by examiner

*Primary Examiner* — Chieh M Fan
*Assistant Examiner* — Aristocratis Fotakis
(74) *Attorney, Agent, or Firm* — Miller, Matthias & Hull, LLP

(57) ABSTRACT

A signal is received by P antennas. It includes frames having symbols occupying respective positions distributed along an axis of time and of frequency, a frame including M blocks having N reference symbols M groups of P weighting coefficients are determined, each one of the groups relating to one of the blocks emitted, with the coefficients of a group being associated to the blocks which are received on the P antennas and which correspond to the block emitted relating to the group. The coefficients are determined so as to increase via a threshold value, an error value for each block emitted, between the reference symbols of the block emitted, and the symbols obtained using the symbols received on each antenna at the positions of reference symbols corresponding to the block emitted and the associated coefficients. Then, weighting coefficients are obtained for the other symbols of the frame Finally, a composite signal is generated by summing up the symbols received respectively weighted by the associated weighting coefficients.

23 Claims, 4 Drawing Sheets

OFDM RECEPTION IN MULTI-ANTENNA MODE

CROSS-REFERENCE TO RELATED APPLICATIONS

This application is a U.S. National Stage filing of Patent Application No. PCI/IB2006/003396 filed on Oct. 5, 2006, claiming priority under the Paris Convention to French Patent Application No. FR 05 10196, filed on Oct. 5, 2005.

FIELD OF THE DISCLOSURE

This invention relates to the reception of OFDM signals in multi-antenna mode It applies to telecommunications networks And more particularly, the invention aims for a method to generate a signal using signals received by different antennas.

BACKGROUND OF THE DISCLOSURE

Such a system is traditionally adapted to receive signals on P different antennas, P being a number strictly greater than 1, and to generate a signal using these P signals received, this generated signal being referred to hereinafter as 'composite signal'.

In such a context of multi-antenna reception, methods are known traditionally called 'antenna diversity method'. Such methods consist in estimating, for each antenna, the signal initially transmitted using the signal received on the basis of an estimation of the propagation channel, then in summing up the signals thus estimated on each antenna in order to generate a corresponding composite signal.

A method of this type allows for high performance and optimal reception, in the case where noise received from the different antennas is decorrelated between them. Indeed, in this context, the instant signal-to-noise ratio pertaining to the composite signal generated in this way is then substantially equal to the sum of the instant signal-to-noise ratios observed on each antenna. These methods make it possible to obtain a gain that is particularly important when the received signals are affected by Rayleigh fadings and when these Rayleigh fadings are independent on each antenna.

However, an antenna diversity method presents inconveniences when the noise when receiving the signal on each antenna is not totally decorrelated. It should be noted that, in the context of this document, the term "noise" designates decorrelated noise and correlated noise at the same time, i.e. also interferential noise The noise received on each antenna is correlated noise, for example, when two communications take place simultaneously on the same channel In this case, the second communication plays the role of an interference in relation to the first communication. The presence of the second communication can be caused by the reuse of frequencies within a same mobile radio network. In such a case, the signal-to-noise ratio of the composite signal obtained by diversity processing is relatively low. The signal-to-noise ratio of the composite signal obtained by diversity processing is as low as the intercorrelation between the noise received on each receiving antenna is high.

SUMMARY OF THE DISCLOSURE

This invention aims to improve the performance of multi-antenna reception.

A first aspect of this invention proposes a signal reception method in a telecommunications network including the reception of a number P of signals on P respective antennas, where P is an integer strictly greater than 1;

said received signals corresponding to a multicarrier signal transmitted in the form of successive frames including symbols occupying respective positions distributed along an axis of time and along an axis of frequency; a frame comprised of M blocks each having at least N reference symbols, with the reference symbols in each of said blocks satisfying a first maximum spacing between them along the axis of time and a second maximum spacing between them along the axis of frequency respectively lower than a first and a second value, N being an integer greater than or equal to P, M being an integer at least equal to two;

said method comprising the following steps:

/a/ determine, at the frame level, M groups of P weighting coefficients, each one of said M groups relating respectively to one of said M blocks of reference symbols emitted, said P coefficients of a group being respectively associated to the blocks of reference symbols which are received on the P antennas and which correspond to the block of reference symbols emitted relating to said group;

said coefficients being determined so as to increase via a threshold value, an error value for each one of the M blocks of reference symbols emitted, between on one hand the reference symbols of said block emitted, and on the other hand symbols obtained using symbols received on each of the P antennas at the positions of the reference symbols corresponding to said block emitted, respectively weighted by said associated weighting coefficients;

/b/ obtain weighting coefficients applicable respectively to the signals received on the P antennas for the other symbols in the frame, by interpoling said weighing coefficient determined at step /a/;

/c/ generate a composite signal by summing up the symbols received respectively on each of the P antennas and corresponding to a same symbol emitted of the frame, each one of said symbols received being respectively weighted by the associated weighting coefficient determined in step /a/ or obtained in step /b/

It is possible for example to carry out step /b/ via an interpolation calculation of the weighting coefficients determined in step /a/.

Note that the term 'interpolation' is used here in a broad sense which in particular covers an interpolation of values carried out on the basis of the inverse of said values. In step /a/, the block of symbols emitted can include reference pilot symbols known by the receiver prior to their reception and/or reference symbols known to the receiver through prior processing, for example via a previous step of demodulation and/or decoding performed beforehand.

In an embodiment of the invention, in step /a/, for each of the blocks of reference symbols, the error corresponds to a quadratic error determined relatively to the N symbols of said block of reference symbols and satisfies the following equation:

$$\|[Z]\cdot \vec{\beta} - \vec{S}\|^2 = \epsilon^2$$

where $\vec{S}$ is a column vector having for items N of symbols $S_n$ of said block of reference symbols emitted, n being an integer index between 1 and N;

where [Z] is a matrix having for items the received symbols $Z_{n,p}$ of the frame, where n represents the line index of the matrix, n being an index integer between 1 and N, and p represents the column index of the matrix, p being an index integer between 1 and P, where $Z_{n,p}$ is the symbol received on the $p^{th}$ antenna and corresponding to the position of symbol $S_n$ of the block of reference symbols emitted; and where $\vec{\beta}$ is a column vector having for items the weighting coefficients $\beta_p$ determined in step /a/ relatively to said block of reference symbols, $\beta_p$ being the weighting coefficient corresponding to the $p^{th}$ antenna.

The column vector of the weighting coefficients $\vec{\beta}$ can be obtained according to the following equation:

$$\vec{\beta} = [[Z]^{*T}[Z]]^{-1}[Z]^{*T}\vec{S}$$

where $[Z]^*$ represents the conjugated matrix of matrix $[Z]$, and where $[Z]^{*T}$ represents the conjugated and transposed version of matrix $[Z]^*$ A second aspect of this invention proposes a reception device for the implementation of a method according to the first aspect, comprised of:
- a reception unit (15) comprising P antennas, each one being adapted to receive a given frame of a signal emitted in the network;
- a determination unit (16) adapted to determine at the frame level, M groups of P weighting coefficients, each one of said M groups relating respectively to one of said M blocks of reference symbols emitted, said P coefficients of a group being respectively associated to the blocks of reference symbols that are received on the P antennas and which correspond to the block of reference symbols emitted relating to said group; said coefficients being determined so as to increase via a threshold value, an error value for each one of the M blocks of reference symbols emitted, between on one hand the reference symbols of said block emitted, and on the other hand symbols obtained using symbols received on each of the P antennas at the positions of the reference symbols corresponding to said block emitted, respectively weighted by said associated weighting coefficients;
- an obtaining unit (17) adapted to obtain, using said weighting coefficients determined by the determination unit, weighting coefficients applicable respectively to the signals received on the P antennas for the other symbols of the frame;
- a generation unit (18) of a composite signal adapted to sum up the symbols received respectively on each of the P antennas and corresponding to a same symbol emitted in the frame, each one of said symbols received being respectively weighted by the associated weighting coefficient provided by the determination unit or the obtaining unit.

A third aspect of this invention proposes a telecommunications system comprising:
- a transmission device adapted to emit a multicarrier signal transmitted in the form of successive frames including symbols occupying respective positions distributed along an axis of time and along an axis of frequency; a frame comprised of M blocks each having at least N reference symbols, with the reference symbols in each of said blocks satisfying a first maximum spacing between them along the axis of time and a second maximum spacing between them along the axis of frequency respectively lower than a first and a second value, N being an integer greater than or equal to P, M being an integer at least equal to two; and
- a receiving device according to the second aspect of this invention

BRIEF DESCRIPTION OF THE DRAWINGS

Other aspects, objectives and advantages of the invention shall appear when reading the description of one of its embodiments.

The invention will also be better understood using the drawings, in which.

MORE DETAILED DESCRIPTION

The invention is described hereinafter in its application to multicarrier systems, as for example systems of the OFDM type for 'Orthogonal Frequency Division Multiplexing'. The invention is applicable for traditional OFDM traditions and also for transmissions of the OFDM/IOTA type, for 'Isotropic Orthogonal Transform Algorithm', as well as for transmissions of the OFDM/OQAM type, for 'Offset Quadrature Amplitude Modulation'. Article "Coded Orthogonal Frequency Division Multiplex", Bernard LE FLOCH et al., Proceedings of the IEEE, Vol. 83, NO. 6, June 1995 provides an example of a definition of an orthogonal time/frequency network with an OFDM structure. A structure adapted for the transmission of OFDM/IOTA type is disclosed in particular in FR19950005455

Figure 1:
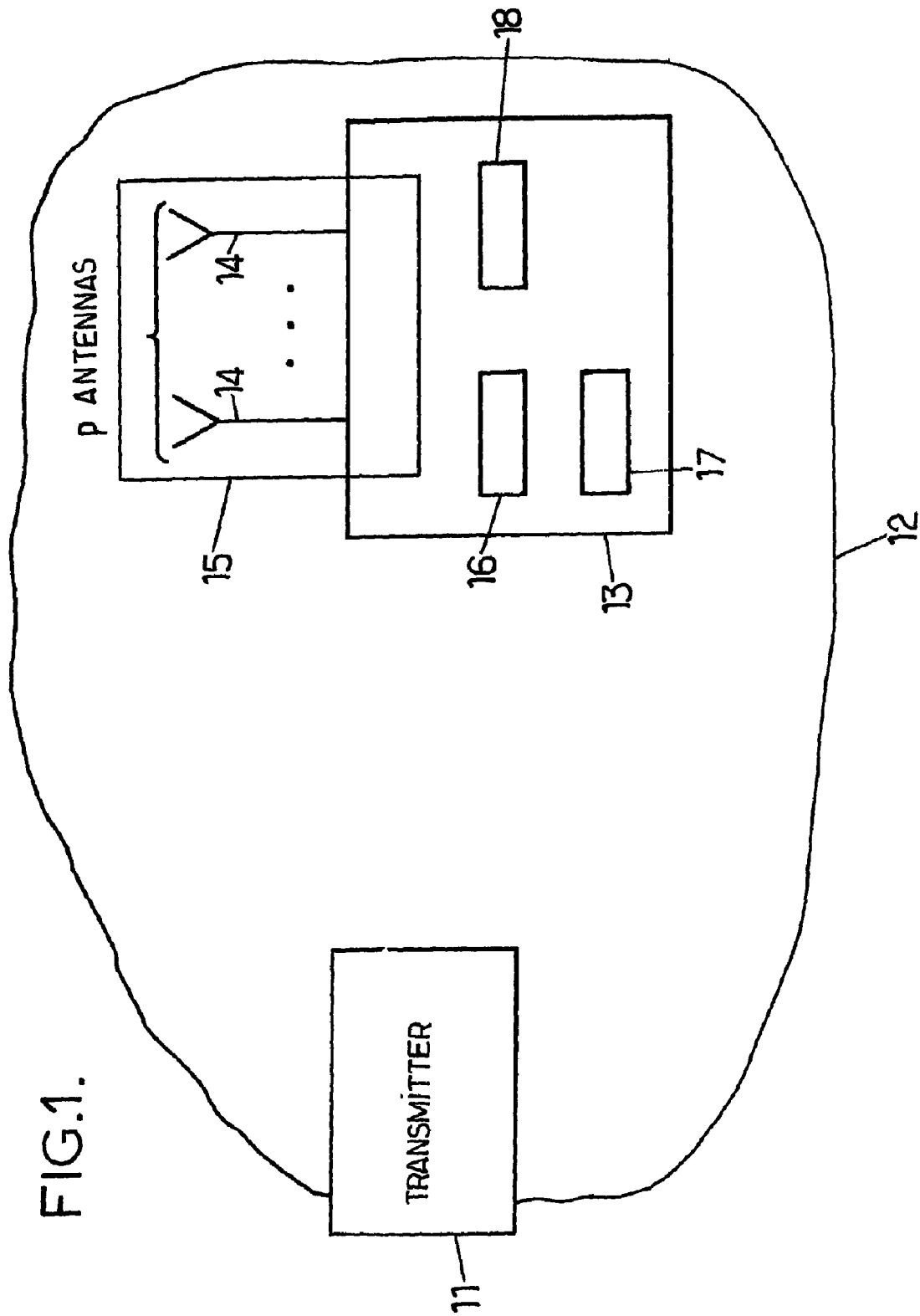
FIG. 1 shows a telecommunications network according to an embodiment of this invention.

This description is not limited and it should be noted that this invention can be applied simply and effectively in other types of telecommunications networks FIG. 1 shows a telecommunications network including a transmitter 11 and a receiver 13 according to an embodiment of this invention. Receiver 13 includes a number P of antennas 14, each one being adapted to receive the signal transmitted by transmitter 11. Receiver 13 includes a reception unit 15 having P antennas, each one being adapted to receive a given frame of the signal. It further comprises a determination unit 16 adapted to determine for each of the blocks of reference symbols of the frame, P weighting coefficients, one for each of the signals coming from each of the antennas, corresponding to said block of reference symbols, in such a way that an error between said block of reference symbols emitted and a linear combination of the blocks of signals received from each of the P antennas corresponding to the symbols of said block of reference symbols, with the coefficients of the linear combination being the P weighting coefficients that are sought, be increased by a threshold value (or that such an error decreases the threshold value). More preferably, the determination of these weighting coefficients is carried out in such a way as to reduce such an error as much as possible. Among the various values that can be determined for these weighting coefficients, the one that yields the lowest error is taken. In such a context, the threshold value can be determined according to the different values of the error obtained in this way For example, the threshold value can correspond to the value of the lowest error obtained from among several error values obtained by varying the weighting coefficients.

The receiver also includes an obtaining unit 17 adapted to obtain a set of P weighting coefficients for each of the other symbols of the frame using weighting coefficients determined by the determination unit. Finally, a generation unit 18 of a composite signal is adapted to sum up the P signal frames received, each one of the signals received on each one of the P antennas, for each symbol in the frame, being affected by the corresponding weighting coefficient provided by the determination unit or the obtaining unit.

A method according to an embodiment of this invention aims to generate a composite signal using signals received by the many antennas of the receiver, so as to increase signal-to-noise ratio pertaining to the composite signal generated More precisely, such a method aims to determine weighting coefficients $\beta_{i,j,p}$ for the signals received in the various antennas p, denoted as $Z_{i,j,p}$, in correspondence with symbols emitted $S_{i,j}$, p being an integer between 1 and P, i and j being integers determining the position of symbol $S_{i,j}$ in the frame. It makes it possible, at reception, to reconstitute in the form of a composite signal, the signal emitted in a more precise manner, by summing up the symbols received by the antennas corresponding to the same position in the signal frame, with each being affected by the determined weighting coefficient. Such a method therefore makes it possible to reduce the signal-to-noise ratio pertaining to the composite signal obtained after processing in relation to the signal-to-noise ratio pertaining to a signal obtained by other methods such as an antenna diversity method, in particular in the case where the noise affecting the signals received on the different antennas is correlated. So, such a method makes it possible in particular to reduce the impact of interference.

A method of reception according to an embodiment of this invention, proposes to determine these weighting coefficients based on at least two blocks of symbols comprised in a frame of the signal, the symbols comprising each one of these blocks being known to the receiver In what follows, a block of reference symbols can be defined as a group of pilot symbols wherein each pilot symbol is contiguous in time or in frequency to at least one other pilot symbol in such a way that said group of pilot symbols is not disjoint.

A block of symbols can also be defined as a group of symbols that satisfy the conditions of stationarity in time and in frequency, such as those mentioned in document FR20010011817 'Multicarrier signal, method for pursuing of a transmission channel of such a signal and device for its implementation'. These conditions of stationarity can translate in terms of maximum spacing of symbols comprising the considered block of symbols So, according to the conditions of propagation of symbols in the telecommunications network, a first and a second value are determined in such a way that, if in a group of symbols, the maximum spacing between the symbols of the group along the axis of time and the maximum spacing between the symbols of the group along the axis of frequency, it can be considered that all of the symbols of the group satisfy the characteristics of propagation substantially the same A symbol block in the sense of this invention corresponds to such a group. So, a block of symbols can be defined by a first and a second value corresponding respectively to a first maximum spacing between the symbols of the block along the axis of time and a second maximum spacing between the symbols along the axis of frequency These time and frequency spacings can be determined according to rules such as those which are defined in the document mentioned hereinabove.

In order to establish such a block of symbols, it can be based on symbols specifically inserted into a frame of the signal by the transmitter. In such a case, the position and the value of these symbols are known by the received prior to the reception of the signal Such symbols are referenced as 'pilot symbols'.

In one variant, it can be based on symbols corresponding to the useful information transmitted, and no longer on pilot symbols inserted specifically into the frame of useful information. In this case, if the receiver has already processed beforehand such a symbol of information, for example by applying a method according to an embodiment of this invention, or one of the demodulation methods of an OFDM system known by those skilled in the art, the receiver has an estimation of the value taken by said symbol and can consider this said symbol as a reference symbol. So, such a symbol can advantageously be a part of a block of reference symbols. The value of the reference symbol estimated in this way is then used.

A method according to an embodiment of this invention is applicable by using a block of symbols including either pilot symbols known to the receiver prior to reception, or reference symbols determined by estimation of the symbols received It can also be applied by using a block of symbols including reference symbols that correspond to pilot symbols as well as to reference symbols determined by prior estimation It is in particular possible to implement a method according to an embodiment of this invention based on the use of a block of symbols including reference symbols known by estimation within the framework of an iterative procedure for demodulating the OFDM signal, whether such a modulation be of the traditional OFDM, OFDM-IOTA or OFDM/OQAM type. Indeed, in such a case, during a first iteration, at reception signal processing can be performed based on a block of pilot symbols. After this first iteration, an estimation can then be determined of the symbols transmitted for each symbol received in a frame.

So, during a second iteration, some of these estimated symbols can be used and a new estimation of the weighting coefficients of the signals coming from the various antennas, using the pilot symbols as well as certain symbols for which an estimate was obtained during the preceding iteration. In such a context, a method according to an embodiment of this invention can advantageously be implemented based on a block of estimated symbols, i.e. known via estimation.

Figure 2:
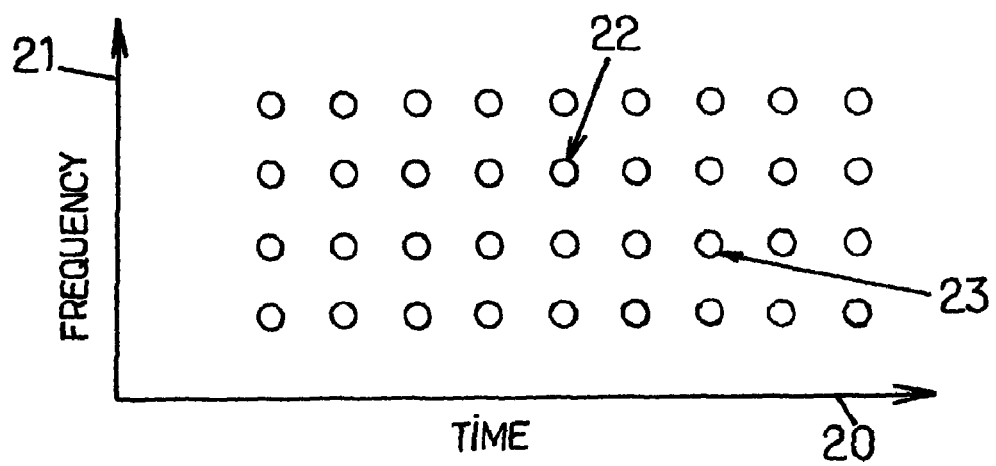
FIG. 2 shows a signal frame structure according to an embodiment of this invention.

In the case of traditional OFDM transmissions, the information symbols are transmitted in parallel over several sub-channels according to a structure such as that shown in FIG. 2. The latter represents, in a frame, a distribution in time and in frequency of the symbols that constitute the signal transmitted. Consequently, in a frame, each symbol $S_{i,j}$ can be identified by its position determined by two coordinates, a coordinate i on the axis of time 20 and a coordinate j on the axis of frequency 21, the latter corresponding to a transmission subchannel number. So, a symbol 22, denoted as $S_{5,3}$, corresponds to symbol time 5 and to subchannel 3, a symbol 23 denoted as $S_{7,2}$, corresponds to symbol time 7 and to subchannel 2.

By construction, in a traditional OFDM transmission, each symbol is orthogonal to all of the other symbols. Orthogonality between symbols, for traditional OFDM, being defined by the nullity of the intercorrelation between said symbols, with correlation being defined in the sense of the field of complex numbers.

In an embodiment, the propagation channel is affected by multiple paths creating frequency selectivity, and frequency spread creating time selectivity. Furthermore, the propagation channel varies over time.

Figure 3:
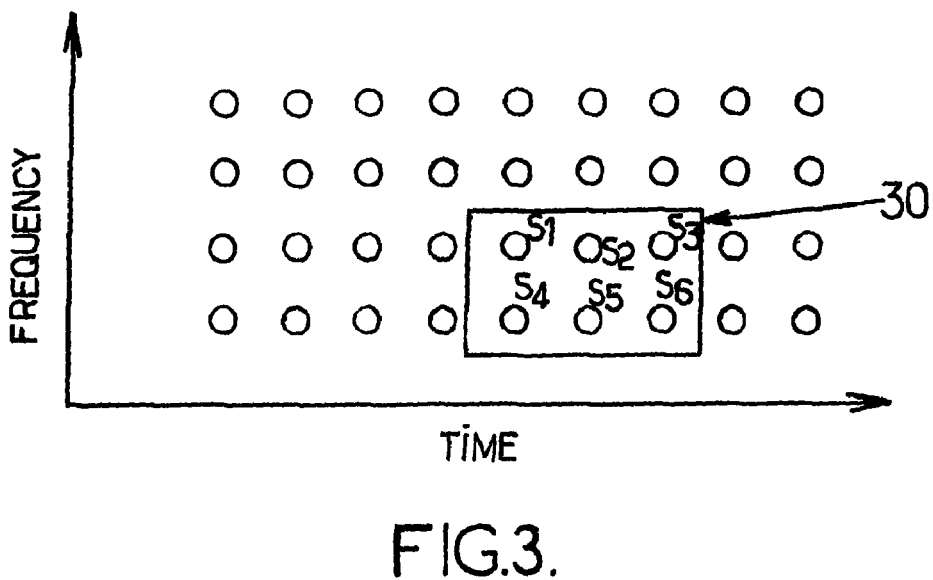
FIG. 3 shows a structure of a block of reference symbols in a frame such as that shown in FIG. 2.

FIG. 3 shows a block of symbols 30, according to an embodiment of this invention, including a block of 6 reference symbols constituted of symbols $S_n$, for n between 1 and 6. For each antenna, a weighting coefficient βp can be determined for each block of signals of the received frame received on antenna p, corresponding to a block of symbols emitted Then, in a following step, using these weighting coefficients calculated on the blocks of reference symbols, P weighting coefficients are thus obtained, one for each antenna, for each of the other symbols in the frame. After this step, a weighting coefficient was determined for each symbol in the frame and for each antenna of the receiver.

Figure 4:
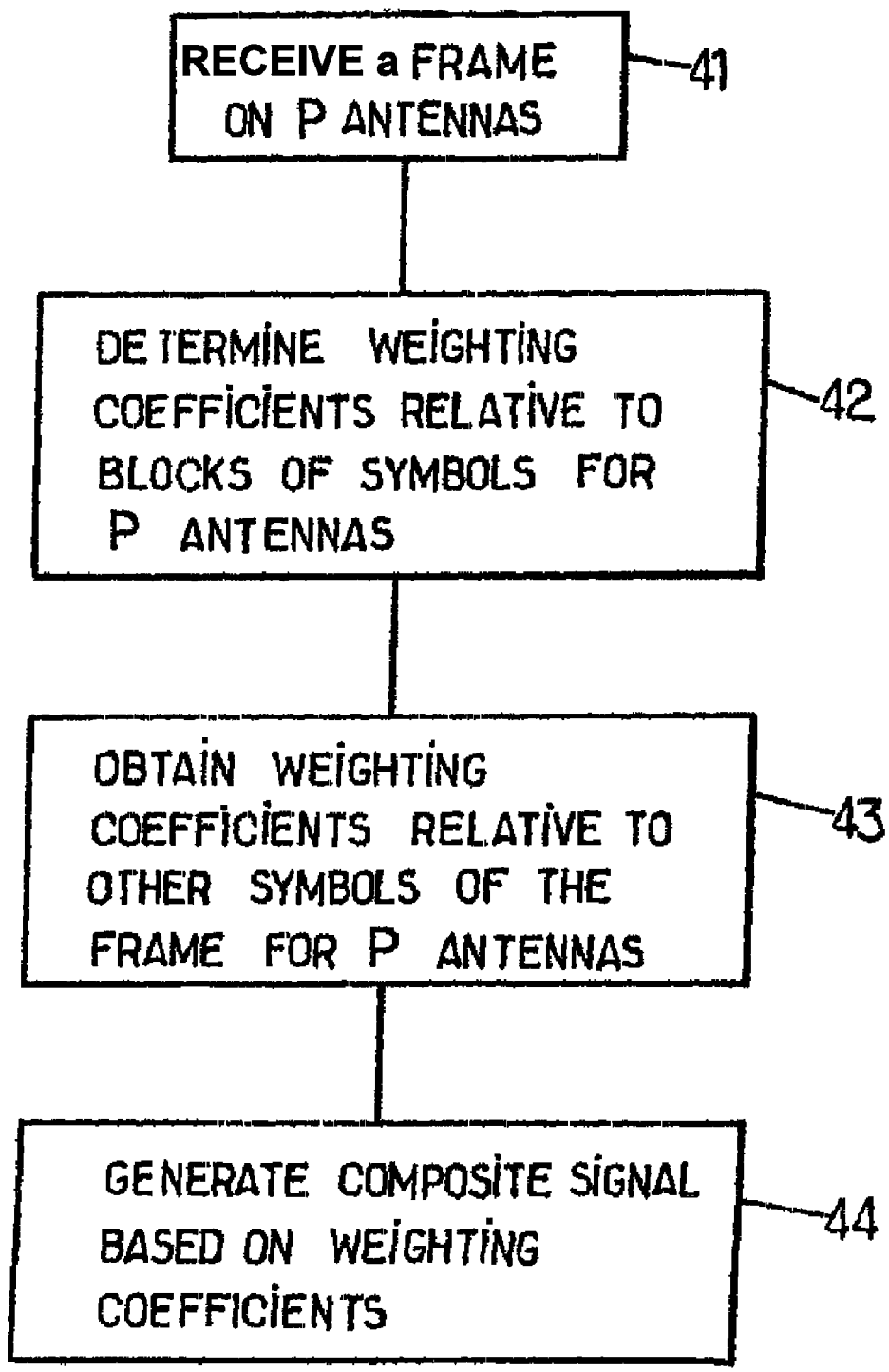
FIG. 4 shows the main steps of a method of reception according to an embodiment of this invention.

FIG. 4 shows the main steps of a method according to an embodiment of this invention.

In step 41, a frame is received on P antennas. This frame includes at least two blocks of reference symbols of the receiver and satisfying determined conditions of stationarity, such as is mentioned in a previous section Then, in step 42, a weighting coefficient is determined for each of the blocks of symbols relative to each antenna p The same weighting coefficient is then assigned to all the symbols of a same block of reference symbols received on a same antenna In step 43, using weighting coefficients obtained in step 42, weighting coefficients are obtained relative to all the other symbols of the frame on all of the P antennas Then, in step 44, a composite signal frame is generated according to the weighting coefficients thus obtained and P signal frames received on each antenna p. By reiterating these steps on each frame, a composite signal can be generated.

This invention covers all the methods making it possible to obtain such weighting coefficients for each antenna and for each one of the symbols of a frame, other than those of the blocks of symbols considered, according to the weighting coefficients already obtained for these blocks.

For example, it is possible to obtain the weighting coefficients pertaining to the other symbols of the frame received on the P antennas, by carrying out an interpolation of the weighting coefficients obtained relatively to the blocks of symbols. Note that the term 'interpolation' is used here in a broad sense which in particular covers an interpolation of values carried out on the basis of the inverse of said values.

So, such an interpolation calculation can implement an interpolation of the traditional type applied directly to the values of the weighting coefficients pertaining to the blocks of symbols, such as a linear interpolation for example, or an interpolation implementing Fourrier Transforms. More preferably, an interpolation step retains, for the symbols of the blocks of reference symbols considered in the frame, the value produced in step 42 of the determination of weighting coefficients pertaining to the symbols of the block of reference symbols Document FR20010011817 'Multicarrier signal, method for pursuing of a transmission channel of such a signal and device for its implementation' proposes such a method of interpoling values. For each antenna, one can, for example, first interpolate according to the axis of time, i e. according to all of the horizontal lines of the frame on which at least one symbol belongs to a block of symbols for which a weighting coefficient was determined beforehand Then, interpolation is carried out along the axis of frequency, i.e. according to all of the columns of the frame for which a weighting coefficient has been determined, i.e., here, all of the columns in the frame.

In one variant, an interpolation calculation can be carried out using the inverse of the weighting coefficients already obtained on the blocks of reference symbols, $1/\beta_p$ Such an interpolation has physical homogeneity to a channel estimate, while an interpolation carried out directly on the basis of weighting coefficients already obtained on the blocks of reference symbols $\beta_p$, is homogenous to the inverse of a channel estimate.

Regardless of the method making it possible to obtain the weighting coefficients in step 43, in what follows, the weighting coefficient corresponding to symbol $S_{i,j}$ received on the $p^{th}$ antenna (or antenna p) is denoted as $\beta_{i,j,p}$.

The sections hereinafter describe embodiments adapted for a network based on traditional OFDM modulation such as that described in reference to FIG. 2.

$Z'_{i,j}$ symbols of the composite signal corresponding to the positions of coordinates i and j such as defined previously, in particular in reference to FIG. 2. A composite signal can then be obtained according to an embodiment of this invention according to the following equation:

$$Z'_{i,j} = \sum_{p=1}^{P} \beta_{i,j,p} \times Z_{i,j,p} \tag{1}$$

In order to represent in a matrix format equations making it possible to implement a method according to an embodiment, the symbols comprising a block of reference symbols are denoted as $S_n$ n being an integer between 1 and N the number of symbols in the block of reference symbols, and are manipulated in the form of a column vector denoted as $\vec{S}$ of size N.

According to an embodiment of this invention, weighting coefficients are first determined relatively to the symbols comprised in a block and for which the hypothesis is made that the propagation channel is substantially stationary.

All of the weighting coefficients $\beta_p$, corresponding to the symbols $Z_{n,p}$ received on antenna p, p being an integer between 1 and P the number of antennas, can be manipulated in the form of a column vector denoted as $\vec{\beta}$ of size P Received symbols $Z_{n,p}$ corresponding to symbols $S_n$ of a block of reference symbols are manipulated in the form of a matrix denoted as [Z], n representing the index of the line of the matrix and p representing the index of the column of the matrix. Matrix [Z] has N lines and P columns.

In accordance with a preceding section, reference symbols $S_n$ can be pilot symbols or symbols obtained by the receiver using processing that is prior to the received signals.

In an embodiment of this invention, weighting coefficients are determined by searching to reduce an error taken in the form of a quadratic error $\epsilon^2$ such as defined in a preceding section Such an error can be calculated for example on the basis of an estimation of least squares so as to reduce the term $\epsilon^2$ in the expression below:

$$\|[Z]\vec{\beta} - \vec{S}\|^2 = \epsilon^2 \tag{2}$$

This latter equation is relative to a given block of reference symbols.

The following is thus obtained:

$$\vec{\beta} = [[Z]^{*T}.[Z]]^{-1}[Z]^{*T}.\vec{S} \tag{3}$$

Number N of symbols in the block of symbols is greater than or equal to the number of P antennas comprised in the receiver, since in the opposite case matrix $[[Z]^{*T}.[Z]]$ is not reversible.

In the case where number N of symbols is at least equal to (P+1), when plugging into equation (2) the value of $\vec{\beta}$ obtained according to equation (3), a value for $\epsilon^2$ is obtained which in general is not null.

Note that an estimation of the average power value of noise present in the composite signal, generated on the basis of a weighted summation of the signals received on the various antennas p, can be expressed according to the following equation:

$$\epsilon^2/N \quad (4)$$

Such a value is relative to a given block of symbols. So, in an embodiment of this invention, as many average power values in a frame are obtained, according to equation (4), as there are blocks of reference symbols considered in said frame.

Once the weighting coefficients $\beta_{i,j,p}$ making it possible to generate the composite signal using the signals received on the P antennas have been obtained, it can be advantageous to determine a likelihood value of the bits comprising the symbols of the composite signal according to certain rules of probability.

So, a method according to an embodiment of this invention further comprises a plausibility calculation. Likelihood values can be used in certain receivers as decision-making parameters in particular as inputs for a channel decoding method for example in the case of the use of convolutional coding in the system.

Each symbol $S_{i,j}$ of the frame emitted is composed of several bits. Within the framework of a telecommunications network based on an OFDM-$4^K$QAM modulation, for which each symbol of the time-frequency plane, defined by the axis of time and the axis of frequency, is modulated with a $4^K$QAM modulation, which defines $4^K$ states and carries 2K bits of information. Half of these bits of information, or K bits of information, are carried by the real axis of the modulation, these bits are denoted as $b_{R,k}$, k being an integer between 1 and K. The other half of these bits of information, or K bits of information, are carried by the imaginary axis of the modulation, these bits are denoted as $b_{I,k}$, k being an integer between 1 and K. In certain conditions, it can be considered that the average power of noise is substantially the same for all the symbols received in a same frame and on all the antennas.

A likelihood value can then be calculated for bit $b_{R,k}$ of symbol $S_{i,j}$ transmitted to symbol time i and on subchannel j according to the following equation:

$$V_{i,j,R,k} = \text{Log}\left(\sum_{a\in E_{R,k,0}} e^{-\frac{\left(\text{Re}\left(\sum_{p=1,P}\beta_{i,j,p}\cdot z_{i,j,p}\right)-a\right)^2}{2\cdot\sum_{p=1,P}|\beta_{i,j,p}|^2}}\right) - \text{Log}\left(\sum_{a\in E_{R,k,1}} e^{-\frac{\left(\text{Re}\left(\sum_{p=1,P}\beta_{i,j,p}\cdot z_{i,j,p}\right)-a\right)^2}{2\cdot\sum_{p=1,P}|\beta_{i,j,p}|^2}}\right) \quad (5)$$

$E_{R,K,0}$ corresponds to a set of amplitude values a taken by the $4^n$QAM modulation along the real axis which correspond to symbols emitted for which the bit carried by the real axis and of rank k, i.e. bit $b_{R,k}$, takes the value 0;

$E_{R,k,1}$ corresponds to a set of amplitude values a, taken by the $4^n$QAM modulation along the real axis which correspond to symbols emitted for which the bit carried by the real axis and of rank k, i.e. bit $b_{R,k}$, takes the value 1;

$E_{I,k,0}$ corresponds to a set of amplitude values a, taken by the $4^n$QAM modulation along the imaginary axis which correspond to symbols emitted for which the bit carried by the imaginary axis and of rank k, i.e. bit $b_{I,k}$, takes the value 0; and $E_{I,k,1}$ corresponds to a set of amplitude values a, taken by the $4^n$QAM modulation along the imaginary axis which correspond to symbols emitted for which the bit carried by the imaginary axis and of rank k, i.e. bit $b_{I,k}$, takes the value 1

Likewise, a likelihood value can then be calculated for bit $b_{I,k}$ of symbol $S_{i,j}$ transmitted to symbol time i and on subchannel j according to the following equation:

$$V_{i,j,I,k} = \text{Log}\left(\sum_{a\in E_{I,k,0}} e^{-\frac{\left(\text{Im}\left(\sum_{p=1,P}\beta_{i,j,p}\cdot z_{i,j,p}\right)-a\right)^2}{2\cdot\sum_{p=1,P}|\beta_{i,j,p}|^2}}\right) - \text{Log}\left(\sum_{a\in E_{I,k,1}} e^{-\frac{\left(\text{Im}\left(\sum_{p=1,P}\beta_{i,j,p}\cdot z_{i,j,p}\right)-a\right)^2}{2\cdot\sum_{p=1,P}|\beta_{i,j,p}|^2}}\right) \quad (6)$$

In the case where a method according to the invention is implemented in a transmission network based on a modulation of the OFDM-4QAM type, for 'Offset Quadrature Amplitude Modulation', each symbol contains only one bit per real or imaginary axis. Furthermore, in this case, the symbols transmitted take values +1 and −1 on each real and imaginary axis Equations (5) and (6) can thus be expressed in a simplified form The following equations can be written (by omitting the rank index of the bit):

$$V_{i,j,R} = 2\cdot\text{Re}\left(\frac{\sum_{p=1,P}\beta_{i,j,p}\cdot z_{i,j,p}}{\sum_{p=1}^{P}\|\beta_{i,j,p}\|^2}\right) \quad (7)$$

$$V_{i,j,I} = 2\cdot\text{Im}\left(\frac{\sum_{p=1,P}\beta_{i,j,p}\cdot z_{i,j,p}}{\sum_{p=1}^{P}\|\beta_{i,j,p}\|^2}\right) \quad (7b)$$

Moreover, in the general case of an OFDM-$4^n$ QAM, equations (5) and (6) can be approximated respectively by the following expressions:

$$V_{i,j,R,k} = -\frac{\underset{a\in E_{R,k,0}}{\text{Min}}\left[\left(\text{Re}\left(\sum_{p=1,P}\beta_{i,j,p}\cdot z_{i,j,p}\right)-a\right)^2\right]}{2\cdot\sum_{p=1,P}\|\beta_{i,j,p}\|^2} + \frac{\underset{a\in E_{R,k,0}}{\text{Min}}\left[\left(\text{Re}\left(\sum_{p=1,P}\beta_{i,j,p}\cdot z_{i,j,p}\right)-a\right)^2\right]}{2\cdot\sum_{p=1,P}\|\beta_{i,j,p}\|^2} \text{ and:} \quad (8)$$

$$V_{i,j,I,k} = -\frac{\underset{a \in E_{R,k,0}}{\text{Min}}\left[\left(\text{Im}\left(\sum_{p=1,P}\beta_{i,j,p} \cdot z_{i,j,p}\right) - a\right)^2\right]}{2 \cdot \sum_{p=1,P}\|\beta_{i,j,p}\|^2} + \quad (9)$$

$$\frac{\underset{a \in E_{R,k,1}}{\text{Min}}\left[\left(\text{Im}\left(\sum_{p=1,P}\beta_{i,j,p} \cdot z_{i,j,p}\right) - a\right)^2\right]}{2 \cdot \sum_{p=1,P}\|\beta_{i,j,p}\|^2}$$

In the case where it is considered that to each symbol $Z'_{i,j}$ of the frame of the composite signal corresponds a noise for which the average power is denoted as $e^2_{i,j}$, it is possible to calculate standardised likelihood values for the bits comprising the symbol of index i,j according to the following equations:

$$VN_{i,j,R,k} = \text{Log}\left(\sum_{a \in E_{R,k,0}} e^{-\frac{\left(\text{Re}\left(\sum_{p=1,P}\beta_{i,j,p} \cdot z_{i,j,p}\right) - a\right)^2}{2 \cdot e^2_{i,1}}}\right) - \quad (10)$$

$$\text{Log}\left(\sum_{a \in E_{R,k,1}} e^{-\frac{\left(\text{Re}\left(\sum_{p=1,P}\beta_{i,j,p} \cdot z_{i,j,p}\right) - a\right)^2}{2 \cdot e^2_{i,1}}}\right) \quad \text{and}$$

$$VN_{i,j,I,k} = \text{Log}\left(\sum_{a \in E_{I,k,0}} e^{-\frac{\left(\text{Im}\left(\sum_{p=1,P}\beta_{i,j,p} \cdot z_{i,j,p}\right) - a\right)^2}{2 \cdot e^2_{i,1}}}\right) - \quad (11)$$

$$\text{Log}\left(\sum_{a \in E_{I,k,1}} e^{-\frac{\left(\text{Im}\left(\sum_{p=1,P}\beta_{i,j,p} \cdot z_{i,j,p}\right) - a\right)^2}{2 \cdot e^2_{i,1}}}\right)$$

In the case where the transmission network is based on a 4QAM-OFDM modulation, equations (10) and (11) can be simplified:

$$VN_{i,j,R} = 2 \cdot \text{Re}\left(\frac{\sum_{p=1,P}\beta_{i,j,p} \cdot z_{i,j,p}}{e^2_{i,j}}\right) \quad (12)$$

$$VN_{i,j,I} = 2 \cdot \text{Im}\left(\frac{\sum_{p=1,P}\beta_{i,j,p} \cdot z_{i,j,p}}{e^2_{i,j}}\right) \quad (12b)$$

Moreover, equations (10) and (11) can also be approximated according to the following equations:

$$VN_{i,j,R,k} = -\frac{\underset{a \in E_{R,k,0}}{\text{Min}}\left[\left(\text{Re}\left(\sum_{p=1,P}\beta_{i,j,p} \cdot z_{i,j,p}\right) - a\right)^2\right]}{2 \cdot e^2_{i,j}} + \quad (13)$$

$$\frac{\underset{a \in E_{R,k,1}}{\text{Min}}\left[\left(\text{Re}\left(\sum_{p=1,P}\beta_{i,j,p} \cdot z_{i,j,p}\right) - a\right)^2\right]}{2 \cdot e^2_{i,j}} \quad \text{and:}$$

$$VN_{i,j,I,k} = -\frac{\underset{a \in E_{I,k,0}}{\text{Min}}\left[\left(\text{Im}\left(\sum_{p=1,P}\beta_{i,j,p} \cdot z_{i,j,p}\right) - a\right)^2\right]}{2 \cdot e^2_{i,j}} + \quad (14)$$

$$\frac{\underset{a \in E_{I,k,1}}{\text{Min}}\left[\left(\text{Im}\left(\sum_{p=1,P}\beta_{i,j,p} \cdot z_{i,j,p}\right) - a\right)^2\right]}{2 \cdot e^2_{i,j}}$$

However, calculating an average power value of noise denoted as $e^2_{i,j}$ relatively to a symbol $S_{i,j}$ of the signal transmitted can prove to be complex.

In an embodiment of this invention, it is considered that the average power of noise is substantially the same for all of the symbols received in a same frame. Such an average power value for the frame considered can then be determined, for example, by estimating relatively to a preceding frame, the average power of noise using an error detected between, on the one hand, the symbols estimated by the receiver, and, on the other hand, the symbols of the composite signal $Z'_{i,j}$ calculated according to a method according to an embodiment of this invention. It is then possible to obtain an average power value of noise, denoted as $\overline{e^2}$, calculated therefore on the preceding frame and used as an estimate of the power of noise for the current frame. In this case, the expression of a standardised likelihood value becomes:

$$VN_{i,j,R,k} = \text{Log}\left(\sum_{a \in E_{R,k,0}} e^{-\frac{\left(\text{Re}\left(\sum_{p=1,P}\beta_{i,j,p} \cdot z_{i,j,p}\right) - a\right)^2}{2 \cdot \overline{e^2}}}\right) - \quad (15)$$

$$\text{Log}\left(\sum_{a \in E_{R,k,1}} e^{-\frac{\left(\text{Re}\left(\sum_{p=1,P}\beta_{i,j,p} \cdot z_{i,j,p}\right) - a\right)^2}{2 \cdot \overline{e^2}}}\right)$$

Respectively:

$$VN_{i,j,I,k} = \text{Log}\left(\sum_{a \in E_{I,k,0}} e^{-\frac{\left(\text{Im}\left(\sum_{p=1,P}\beta_{i,j,p} \cdot z_{i,j,p}\right) - a\right)^2}{2 \cdot \overline{e^2}}}\right) - \quad (16)$$

$$\text{Log}\left(\sum_{a \in E_{I,k,1}} e^{-\frac{\left(\text{Im}\left(\sum_{p=1,P}\beta_{i,j,p} \cdot z_{i,j,p}\right) - a\right)^2}{2 \cdot \overline{e^2}}}\right)$$

In the case where the transmission network is an OFDM network based on a 4QAM modulation, the two preceding equations can be simplified and the following can thus be written:

$$VN_{i,j,R} = 2 \cdot \text{Re}\left(\frac{\sum_{p=1,P}\beta_{i,j,p} \cdot z_{i,j,p}}{\overline{e^2}}\right) \quad (17)$$

$$VN_{i,j,I} = 2 \cdot \text{Im}\left(\frac{\sum_{p=1,P}\beta_{i,j,p} \cdot z_{i,j,p}}{\overline{e^2}}\right) \quad (17b)$$

Moreover, equations (15) and (16) can be approximated by the following two equations:

$$VN_{i,j,R,k} = -\frac{\underset{a \in E_{R,k,0}}{\text{Min}}\left[\left(\text{Re}\left(\sum_{p=1,P}\beta_{i,j,p} \cdot z_{i,j,p}\right) - a\right)^2\right]}{2 \cdot \overline{e^2}} + \qquad (18)$$

$$\frac{\underset{a \in E_{R,k,1}}{\text{Min}}\left[\left(\text{Re}\left(\sum_{p=1,P}\beta_{i,j,p} \cdot z_{i,j,p}\right) - a\right)^2\right]}{2 \cdot \overline{e^2}}$$

and:

$$VN_{i,j,I,k} = -\frac{\underset{a \in E_{I,k,0}}{\text{Min}}\left[\left(\text{Im}\left(\sum_{p=1,P}\beta_{i,j,p} \cdot z_{i,j,p}\right) - a\right)^2\right]}{2 \cdot \overline{e^2}} + \qquad (19)$$

$$\frac{\underset{a \in E_{I,k,1}}{\text{Min}}\left[\left(\text{Im}\left(\sum_{p=1,P}\beta_{i,j,p} \cdot z_{i,j,p}\right) - a\right)^2\right]}{2 \cdot \overline{e^2}}$$

In the case where the weighting coefficients of the symbols in the frame, other than those pertaining to the symbols of the block, are obtained by inverse interpolation, equations (15) and (16), can be expressed respectively according to the following equations:

$$VN_{i,j,R,k} = \text{Log}\left(\sum_{a \in E_{R,k,0}} e^{-\frac{\left(\text{Re}\left(\sum_{p=1,P}\left(\frac{1}{\beta}\right)_{i,j,p} z_{i,j,p}\right) - a\right)^2}{2 \cdot \overline{e^2}}}\right) - \qquad (20)$$

$$\text{Log}\left(\sum_{a \in R_{I,k,1}} e^{-\frac{\left(\text{Re}\left(\sum_{p=1,P}\left(\frac{1}{\beta}\right)_{i,j,p} z_{i,j,p}\right) - a\right)^2}{2 \cdot \overline{e^2}}}\right)$$

Respectively:

$$VN_{i,j,I,k} = \text{Log}\left(\sum_{a \in E_{I,k,0}} e^{-\frac{\left(\text{Im}\left(\sum_{p=1,P}\left(\frac{1}{\beta}\right)_{i,j,p} z_{i,j,p}\right) - a\right)^2}{2 \cdot \overline{e^2}}}\right) - \qquad (21)$$

$$\text{Log}\left(\sum_{a \in E_{I,k,1}} e^{-\frac{\left(\text{Im}\left(\sum_{p=1,P}\left(\frac{1}{\beta}\right)_{i,j,p} z_{i,j,p}\right) - a\right)^2}{2 \cdot \overline{e^2}}}\right)$$

wherein $(1/\beta)_{i,j,p}$ corresponds to the value obtained by inverse interpolation of the weighting coefficients pertaining to the block of symbols.

Equations (17) to (19) follow the same model as equations (20) and (21) in the case of interpolation based on the inverse of the weighting coefficients The same applies to equations (6) to (14).

In one variant, it can be advantageous to establish equations making it possible to take into account differences in the power of noise between the symbols of a same frame, along the axis of time or along that of frequency. For this purpose, the basis can be an average power value of noise relative to each block of reference symbols considered in the frame by using the expression (4) which provides an average power value of noise for a given symbol block. In this case, the same power value of noise corresponding to that obtained by equation (4) is assigned to all the symbols of a same block.

So, using estimated powers of noise relatively to the symbols of blocks of symbols, estimated powers of noise can be determined, denoted as $(\epsilon^2/N)_{i,j}$ for each of the symbols in the frame indexed i,j To this aim it can be advantageous to apply any one of the interpolation calculations indicated in the preceding sections in reference to the determination of the values of the weighting coefficients for signals received on the various antennas corresponding to the symbols of the frame received using coefficients obtained for the blocks of reference symbols defined in the frame.

It is therefore noted that it is also possible to obtain an estimation of these power values of noise using the inverse of the power values obtained relatively to the blocks of symbols.

Regardless of the method of interpolation of power values of noise used, the following equations make it possible to obtain an estimation of the standardised likelihood values, using the same notations as previously defined.

$$VNE_{i,j,R,k} = \text{Log}\left(\sum_{a \in E_{R,k,0}} e^{-\frac{\left(\text{Re}\left(\sum_{p=1,P}\beta_{i,j,p} \cdot z_{i,j,p}\right) - a\right)^2}{2\left(\frac{\epsilon^2}{N}\right)_{i,j}}}\right) - \qquad (22)$$

$$\text{Log}\left(\sum_{a \in E_{R,k,1}} e^{-\frac{\left(\text{Re}\left(\sum_{p=1,P}\beta_{i,j,p} \cdot z_{i,j,p}\right) - a\right)^2}{2\left(\frac{\epsilon^2}{N}\right)_{i,j}}}\right)$$

and:

$$VNE_{i,j,I,k} = \text{Log}\left(\sum_{a \in E_{I,k,0}} e^{-\frac{\left(\text{Im}\left(\sum_{p=1,P}\beta_{i,j,p} \cdot z_{i,j,p}\right) - a\right)^2}{2\left(\frac{\epsilon^2}{N}\right)_{i,j}}}\right) - \qquad (23)$$

$$\text{Log}\left(\sum_{a \in E_{I,k,1}} e^{-\frac{\left(\text{Im}\left(\sum_{p=1,P}\beta_{i,j,p} \cdot z_{i,j,p}\right) - a\right)^2}{2\left(\frac{\epsilon^2}{N}\right)_{i,j}}}\right)$$

In the case where the transmission network is based on 4QAM-OFDM modulation, the preceding equations are simplified:

$$VNE_{i,j,R} = 2 \cdot \text{Re}\left(\frac{\sum_{p=1,P}\beta_{i,j,p} \cdot z_{i,j,p}}{\left(\frac{\epsilon^2}{N}\right)_{i,j}}\right) \qquad (24)$$

$$VNE_{i,j,I} = 2 \cdot \text{Im}\left(\frac{\sum_{p=1,P}\beta_{i,j,p} \cdot z_{i,j,p}}{\left(\frac{\epsilon^2}{N}\right)_{i,j}}\right) \qquad (24b)$$

Moreover, equations (22) and (23) can be approximated by:

$$VNE_{i,j,R,k} = -\frac{\underset{a\in E_{R,k,0}}{\text{Min}}\left[\left(\text{Re}\left(\sum_{p=1,P}\beta_{i,j,p}\cdot z_{i,j,p}\right)-a\right)^2\right]}{2\cdot\left(\frac{\varepsilon^2}{N}\right)_{i,j}} + \frac{\underset{a\in E_{R,k,1}}{\text{Min}}\left[\left(\text{Re}\left(\sum_{p=1,P}\beta_{i,j,p}\cdot z_{i,j,p}\right)-a\right)^2\right]}{2\cdot\left(\frac{\varepsilon^2}{N}\right)_{i,j}} \quad (25)$$

and:

$$VNE_{i,j,I,k} = -\frac{\underset{a\in E_{I,k,0}}{\text{Min}}\left[\left(\text{Im}\left(\sum_{p=1,P}\beta_{i,j,p}\cdot z_{i,j,p}\right)-a\right)^2\right]}{2\cdot\left(\frac{\varepsilon^2}{N}\right)_{i,j}} + \frac{\underset{a\in E_{I,k,1}}{\text{Min}}\left[\left(\text{Im}\left(\sum_{p=1,P}\beta_{i,j,p}\cdot z_{i,j,p}\right)-a\right)^2\right]}{2\cdot\left(\frac{\varepsilon^2}{N}\right)_{i,j}} \quad (26)$$

The following two equations can also be obtained easily, for an interpolation based on the inverse values of the weighting coefficients $$VNE_{i,j,R,k} = \text{Log}\left(\sum_{s\in S_{R,k,0}} e^{-\frac{\left(\text{Re}\left(\sum_{p=1,P}\left(\frac{1}{\beta}\right)_{interp_{i,j,p}}\frac{z_{i,j,p}}{}\right)-s\right)^2}{2\left(\frac{\varepsilon^2}{N}\right)_{interp,i,j}}}\right) -$$

$$\text{Log}\left(\sum_{s\in S_{R,k,1}} e^{-\frac{\left(\text{Re}\left(\sum_{p=1,P}\left(\frac{1}{\beta}\right)_{interp_{i,j,p}}\frac{z_{i,j,p}}{}\right)-s\right)^2}{2\left(\frac{\varepsilon^2}{N}\right)_{interp,i,j}}}\right)$$

Respectively:

$$VNE_{i,j,I,k} = \text{Log}\left(\sum_{s\in S_{I,k,0}} e^{-\frac{\left(\text{Re}\left(\sum_{p=1,P}\left(\frac{1}{\beta}\right)_{interp_{i,j,p}}\frac{z_{i,j,p}}{}\right)-s\right)^2}{2\left(\frac{\varepsilon^2}{N}\right)_{interp,i,j}}}\right) -$$

$$\text{Log}\left(\sum_{s\in S_{I,k,1}} e^{-\frac{\left(\text{Re}\left(\sum_{p=1,P}\left(\frac{1}{\beta}\right)_{interp_{i,j,p}}\frac{z_{i,j,p}}{}\right)-s\right)^2}{2\left(\frac{\varepsilon^2}{N}\right)_{interp,i,j}}}\right)$$

So, a method according to an embodiment of this invention can be implemented using blocks of reference symbols for which the receiver has knowledge which is more or less accurate, either because they are symbols specifically introduced into the frame of the signal emitted, i.e. pilot symbols known beforehand to the receiver, or because the receiver has performed a prior estimate of certain symbols transmitted using the signals received, said estimated symbols then being considered as being symbols known to the receiver beforehand.

Using such blocks of reference symbols satisfying the criteria of stationarity such as mentioned hereinabove, it is possible to apply the steps previously described and to obtain weighting coefficients, associated to each of the antennas, and where applicable a power of noise, for each block of reference symbols considered. The weighting coefficients and where applicable the power of noise are then assigned to all of the reference symbols of the block considered Then, by implementing a method of interpolation, it is possible to obtain weighting coefficients, associated to each of the antennas, and where applicable a power value of noise, relatively for each symbol in the frame. The values of the weighting coefficients obtained for the symbols in the block are preferably not modified by the interpolation step.

An embodiment of this invention that can be implemented is a transmission network based on a modulation of the OFDM/IOTA or OFDM/OQAM type. The following sections present the modifications to be made to the previously mentioned equations within the framework of such a transmission network.

Figure 5:
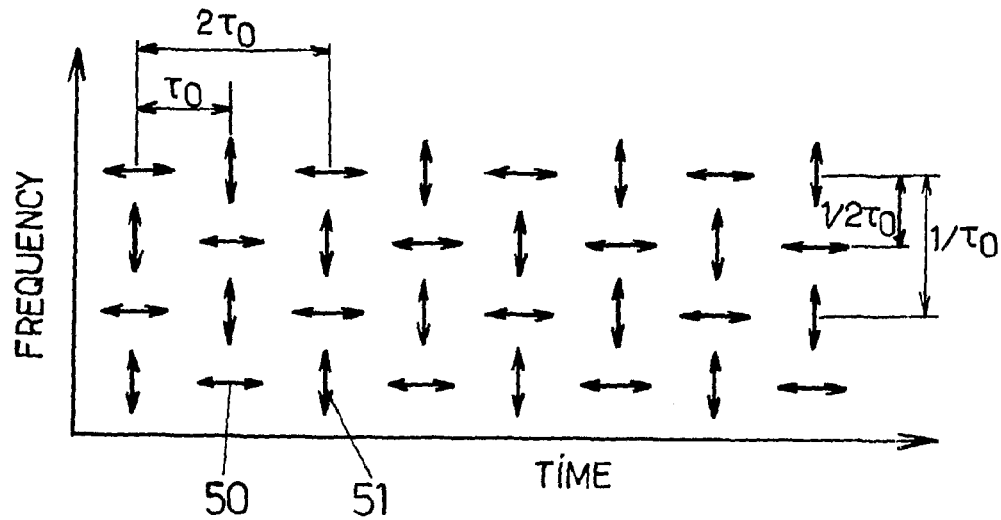
FIG. 5 shows a signal frame structure according to another embodiment of this invention.

In this type of modulation, the symbols are transmitted according to the structure described in FIG. 5 The symbols transmitted here are single-dimensional. Indeed, they are alternatively purely real and purely imaginary, along the axis of time as well as along the axis of frequency, as is the case respectively for reference symbol 50, and that of reference 51. Each symbol is orthogonal to all the other symbols. Within the framework of an OFDM/IOTA or OFDM/OQAM modulation, two symbols are orthogonal when the real part of their intercorrelation is null.

Figure 6:
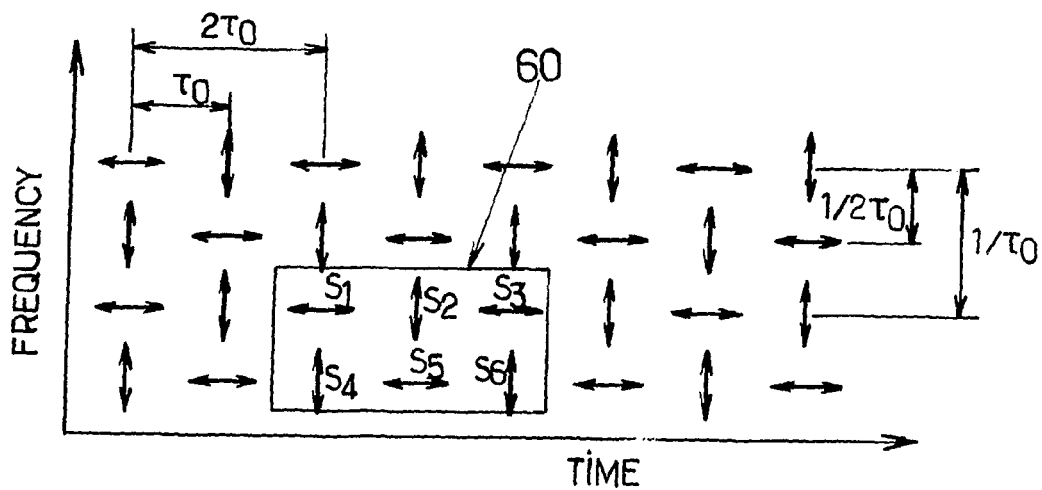
FIG. 6 shows a structure of a block of reference symbols in a frame such as that shown in FIG. 5.

In FIGS. 5 and 6, the double vertical arrows represent purely real symbols and the double horizontal arrows represent purely imaginary symbols. In these figures, $\tau_0$ represents the spacing between two symbols in the frame along the axis of time.

FIG. 6 shows a block of reference symbols 60 according to an embodiment of this invention in a frame transmitted according to such a modulation. This block of reference symbols 60 includes six symbols $S_n$, for n ranging from 1 to 6. In the case shown here, the conditions of stationarity are met for a spacing along the axis of time equal to two inter-symbol spacings and for a spacing along the axis of frequency equal to one inter-symbol spacing.

Received symbol $Z_{i,j\_p}$ corresponds to the reception of symbol $S_{i,j}$ by antenna p. In an embodiment of this invention corresponding to a transmission of the OFDM/IOTA or OFDM/OQAM type, the received symbols $Z_{i,j,p}$ are transformed into $ZZ_{i,j\_p}$ according to a determined rule.

Due to the alternation of the symbols emitted which are either purely real or purely imaginary, this rule consists in multiplying the received symbols by complex number –j if they correspond to symbols emitted $S_{i,j}$ that are purely imaginary, and in not transforming the symbols received corresponding to symbols emitted $S_{i,j}$ that are purely real The same transformation rule is applied to symbols emitted $S_{i,j}$ their transformed value is then denoted as $SS_{i,j}$ Transformed symbols $SS_{i,j}$ are therefore purely real and satisfy the following equations:

$SS_{ij}=S_{ij}$; if $S_{i,j}$ is purely real;

$SS_{ij}=-j\,S_{ij}$; if $S_{i,j}$ is purely imaginary

Noted as $\vec{SS}$ is a column vector having for items symbols $SS_n$ of the block of symbols corresponding to the transformed value of the block of reference symbols $S_n$ relatively to which the weighting coefficients by antenna are determined.

Noted as [ZZ] is the matrix having for items the symbols received $ZZ_{n,p}$, corresponding to the transformed values of the symbols received $Z_{n,p}$ on antenna p, n representing the index of the line of the matrix and p representing the index of the column of the matrix. As in the previous sections pertaining to traditional OFDM modulation, $\vec{\beta}$ designates a column vector having for items the weighting coefficients pertaining to the symbols of a block of reference symbols considered corresponding to the items of the matrix $\vec{SS}$.

In such a context, the quadratic error that we are trying to reduce for a given block of reference symbols can then be expressed in the following form:

$$\|Re([ZZ].\vec{\beta}) - \vec{SS}\|^2 = \epsilon^2 \quad (27)$$

From this can then be deduced:

$$[ZZ]^{*T}.Re([ZZ].\vec{\beta}) = [ZZ]^{*T}.\vec{SS} \quad (28)$$

An equation is therefore obtained, which makes it possible to determine the weighting coefficients pertaining to the symbols comprised in the block of reference symbols considered, in the following form:

$$\begin{bmatrix} Re\ (\vec{\beta}) \\ Im\ (\vec{\beta}) \end{bmatrix} = M \cdot \begin{bmatrix} Re\ ([ZZ]^{*T} \cdot \vec{SS}) \\ Im\ ([ZZ]^{*T} \cdot \vec{SS}) \end{bmatrix} \quad (29)$$

where M is a matrix defined by blocks according to the following equation:

$$M = \begin{bmatrix} \|Re([ZZ])\|^2 & -Re([ZZ])^T \cdot Im([ZZ]) \\ -Im([ZZ]^T) \cdot Re([ZZ]) & \|Im([ZZ])\|^2 \end{bmatrix}^{-1} \quad (30)$$

In an embodiment of this invention, the number of symbols in a block of reference symbols is greater than or equal to two times P the number of antennas in such a way that matrix M is reversible.

In the case where the number N of symbols in a block of reference symbols is greater than or equal to 2 times P plus one, or 2×P+1, by plugging into the equation (27) the value of the weighting coefficients included in the vector $\vec{\beta}$ obtained according to equation (29), the value of $\epsilon^2$ is generally not null.

For a given block of reference symbols in the frame, an estimation of an average power value of noise present in the composite signal, i.e. the signal coming from the summation of the weighted channels, can be expressed in the form:

$$\epsilon^2/N \quad (31)$$

In the same way as in the framework of a traditional OFDM modulation, using weighting coefficients obtained previously relatively to the symbols of the blocks of reference symbols considered, weighting coefficients $\beta_{i,j,p}$ are obtained relatively to all the other symbols of the frame. One of the interpolations described in the preceding sections can thus be used for this purpose.

Then, for each symbol in the frame, a composite signal is generated using the signals received on each one of the antennas and the weighting coefficients that correspond to them. Such a composite signal is formed of symbols $ZZ'_{i,j}$ that are calculated as follows:

$$zz'_{i,j} = \sum_{p=1,P} \beta_{i,j,p} \cdot zz_{i,j,p} \quad (32)$$

For an OFDM/IOTA system, and more generally for an OFDM/OQAM system using for each symbol a modulation of the ASK type (for 'Amplitude Shift Keying'), the symbols are modulated as $2^n$ASK which corresponds to a modulation with $2^n$ states. Indeed, since each symbol is single-dimensional, the information is carried by the amplitude along the axis of the corresponding symbol, purely real or purely imaginary. More precisely, symbols Si,j are transformed into symbols SSi,j, according to the transformation described hereinabove, which are all real. The values taken on the various states in the modulation, by the symbols SSi,j, are therefore all real. A $2^n$ASK modulation carries n bits of information per symbol and this has $2^n$ states. The different bits of information will be distinguished from a same symbol in what follows by their rank k.

In this context, with the hypothesis that the average power of noise is substantially the same or varies little for all of the symbols received in a same frame and on all the antennas, a likelihood value for a bit of rank k $b_k$ of symbol $S_{ij}$ transmitted to symbol time i and on subchannel j can be calculated according to the following equation:

$$V_{i,j,k} = Log\left(\sum_{a \in E_{k,0}} e^{-\frac{(Re(\sum_{p=1,P}\beta_{i,j,p} \cdot zz_{i,j,p}) - a)^2}{2 \cdot \sum_{p=1,P}\|\beta_{i,j,p}\|^2}}\right) - Log\left(\sum_{a \in E_{k,1}} e^{-\frac{(Re(\sum_{p=1,P}\beta_{i,j,p} \cdot zz_{i,j,p}) - a)^2}{2 \cdot \sum_{p=1,P}\|\beta_{i,j,p}\|^2}}\right) \quad (33)$$

In this equation, $E_{k,0}$ corresponds to a set of amplitude values a, with these amplitudes corresponding to real numbers, taken by the $2^n$ASK modulation which correspond to symbols emitted for which the bit carried by the modulation and of rank k takes the value 0; and $E_{k,1}$ corresponds to a set of amplitude values a taken by the $2^n$ASK modulation which correspond to symbols emitted for which the bit carried by the axis of the modulation and of rank k takes the value 1.

In the case where the transmission network is based on an OFDM/IOTA or OFDM/OQAM modulation—in which the symbols are modulated as 2-ASK, each symbol carries only one bit of information. Furthermore the symbols transmitted take values +1 and −1 The preceding equation can therefore be written according to the following equation:

$$V_{i,j} = 2 \cdot Re\left(\frac{\sum_{p=1,P} \beta_{i,j,p} \cdot zz_{i,j,p}}{\sum_{p=1,P} \|\beta_{i,j,p}\|^2}\right) \quad (34)$$

Moreover, equation (33) can be approximated by the following equation:

$$V_{i,j,k} = \frac{\underset{a \in E_{k,0}}{\text{Min}}\left[\left(\text{Re}\left(\sum_{p=1,P} \beta_{i,j,p} \cdot zz_{i,j,p}\right) - a\right)^2\right]}{2 \cdot \sum_{p=1,P} \|\beta_{i,j,p}\|^2} + \frac{\underset{a \in E_{k,1}}{\text{Min}}\left[\left(\text{Re}\left(\sum_{p=1,P} \beta_{i,j,p} \cdot zz_{i,j,p}\right) - a\right)^2\right]}{2 \cdot \sum_{p=1,P} \|\beta_{i,j,p}\|^2} \quad (35)$$

In the case where it is considered that to each symbol $ZZ'_{i,j}$ of the frame of the composite signal corresponds a noise for which the average power is denoted as $e^2_{i,j}$, it is possible to calculate standardised likelihood values for the bits comprising the symbol of index i,j according to the following equations:

$$VN_{i,j,k} = \text{Log}\left(\sum_{a \in E_{k,0}} e^{-\frac{\left(\text{Re}\left(\sum_{p=1,P} \beta_{i,j,p} \cdot zz_{i,j,p}\right) - a\right)^2}{2 \cdot e^2_{i,j}}}\right) - \text{Log}\left(\sum_{a \in E_{k,1}} e^{-\frac{\left(\text{Re}\left(\sum_{p=1,P} \beta_{i,j,p} \cdot zz_{i,j,p}\right) - a\right)^2}{2 \cdot e^2_{i,j}}}\right) \quad (36)$$

In the case where the transmission network is based on an OFDM/IOTA or OFDM/OQAM modulation using for the symbols a 2-ASK modulation, each symbol contains only one bit of information. Furthermore, the symbols transmitted take values +1 and −1. The preceding equation can therefore be expressed in the following form:

$$VN_{i,j} = 2 \cdot \text{Re}\left(\frac{\sum_{p=1,P} \beta_{i,j,p} \cdot zz_{i,j,p}}{e^2_{i,j}}\right) \quad (37)$$

Moreover, equation (36) can be approximated in the form of the following equation:

$$VN_{i,j,k} = -\frac{\underset{a \in E_{k,0}}{\text{Min}}\left[\left(\text{Re}\left(\sum_{p=1,P} \beta_{i,j,p} \cdot zz_{i,j,p}\right) - a\right)^2\right]}{2 \cdot e^2_{i,j}} + \frac{\underset{a \in E_{k,1}}{\text{Min}}\left[\left(\text{Re}\left(\sum_{p=1,P} \beta_{i,j,p} \cdot zz_{i,j,p}\right) - a\right)^2\right]}{2 \cdot e^2_{i,j}} \quad (38)$$

It can sometimes be complex to determine a value of $e^2_{i,j}$ for each symbol $S_{i,j}$.

It can then be advantageous, to replace in expressions (36) to (38), the terms $e^2_{i,j}$ with an average power value of noise over all of the symbols in the frame. Such a value can be determined by example using the preceding frame. More precisely, such a value denoted as $\overline{e^2}$ corresponds to an estimated average power value of noise, relatively to a frame preceding the given frame, using an error between the composite symbols pertaining to said preceding frame and the estimated symbols of the same said preceding frame.

In the case where the hypothesis is made that the power value of noise is substantially stationary or varies little over time and frequency over a same frame over the different symbols, an expression of the standardised likelihood value can then satisfy the following equation:

$$VN_{i,j,k} = \text{Log}\left(\sum_{a \in E_{k,0}} e^{-\frac{\left(\text{Re}\left(\sum_{p=1,P} \beta_{i,j,p} \cdot zz_{i,j,p}\right) - a\right)^2}{2 \cdot \overline{e^2}}}\right) - \text{Log}\left(\sum_{a \in E_{k,1}} e^{-\frac{\left(\text{Re}\left(\sum_{p=1,P} \beta_{i,j,p} \cdot zz_{i,j,p}\right) - a\right)^2}{2 \cdot \overline{e^2}}}\right) \quad (39)$$

In the case where the transmission network is based on an OFDM/IOTA or OFDM/OQAM structure using for symbols a 2-ASK modulation, each symbol contains in this case only one bit of information. Furthermore the symbols transmitted take values +1 and −1. The preceding equation can therefore be expressed in the following form:

$$VN_{i,j} = 2 \cdot \text{Re}\left(\frac{\sum_{p=1,P} \beta_{i,j,p} \cdot zz_{i,j,p}}{\overline{e^2}}\right) \quad (40)$$

Moreover, equation (39) can be approximated by:

$$VN_{i,j,k} = -\frac{\underset{a \in E_{k,0}}{\text{Min}}\left[\left(\text{Re}\left(\sum_{p=1,P} \beta_{i,j,p} \cdot zz_{i,j,p}\right) - a\right)^2\right]}{2 \cdot \overline{e^2}} + \frac{\underset{a \in E_{k,1}}{\text{Min}}\left[\left(\text{Re}\left(\sum_{p=1,P} \beta_{i,j,p} \cdot zz_{i,j,p}\right) - a\right)^2\right]}{2 \cdot \overline{e^2}} \quad (41)$$

In the case where the inverse of the weighting coefficients $1/\beta_p$ are interpolated, note as $(1/\beta)_{i,j,p}$ the inverse of the coefficients interpolated in this way corresponding to the symbol transmitted to symbol time i and on subchannel j, and received by the $p^{th}$ antenna. P interpolations are therefore carried out, once for each antenna A standardized likelihood value can then be written:

$$VN_{i,j,k} = \text{Log}\left(\sum_{a \in E_{k,0}} e^{-\frac{\left(\text{Re}\left(\sum_{p=1,P} \frac{zz_{i,j,p}}{\left(\frac{1}{\beta}\right)_{i,j,p}}\right) - a\right)^2}{2 \cdot \overline{e^2}}}\right) - \text{Log}\left(\sum_{a \in E_{k,1}} e^{-\frac{\left(\text{Re}\left(\sum_{p=1,P} \frac{zz_{i,j,p}}{\left(\frac{1}{\beta}\right)_{i,j,p}}\right) - a\right)^2}{2 \cdot \overline{e^2}}}\right) \quad (42)$$

In the case where the network is based on an OFDM-4QAM modulation, the preceding equations can be simplified as follows:

$$VN_{i,j} = \frac{2}{e^2} \cdot \text{Re}\left(\sum_{p=1,P} \frac{zz_{i,j,p}}{\left(\frac{1}{\beta}\right)_{i,j,p}}\right) \quad (43)$$

Equation (42) can be approximated as such:

$$VN_{i,j,k} = -\frac{\min_{a \in E_{k,0}}\left[\left(\text{Re}\left(\sum_{p=1,P} \frac{zz_{i,j,p}}{\left(\frac{1}{\beta}\right)_{i,j,p}}\right) - a\right)^2\right]}{2 \cdot e^2} + \frac{\min_{a \in E_{k,1}}\left[\left(\text{Re}\left(\sum_{p=1,P} \frac{zz_{i,j,p}}{\left(\frac{1}{\beta}\right)_{i,j,p}}\right) - a\right)^2\right]}{2 \cdot e^2} \quad (44)$$

In one variant, it can be advantageous to establish equations making it possible to take into account differences in powers of noise between the symbols of a same frame, along the axis of time or along that of frequency. For this purpose, the basis can be an average power value of noise relative to each block of reference symbols considered in the frame by using the expression (31) which provides an average power value of noise for a given reference symbol block. Equation (31) makes it possible to obtain an estimation of a power value of noise for a block of references symbols of a frame when the number of reference symbols is at least equal to 2×P+1 in a block of reference symbols.

So, using estimated powers of noise relatively to the symbols of blocks of symbols, estimated powers of noise can be determined, denoted as $(\epsilon^2/N)_{ij}$ for each one of the symbols in the frame indexed i,j.

To this aim it can be advantageous to apply any one of the interpolation calculations indicated in the preceding sections, in particular in reference to the determination of the values of the weighting coefficients for signals received on the various antennas using coefficients obtained for the symbols of the blocks of reference symbols defined in the frame It is therefore noted that it is also possible for example to obtain an estimation of these power values of noise using the inverse of the power values obtained relatively to the blocks of symbols.

Regardless of the method of interpolation of power values of noise used, the following equations make it possible to obtain an estimation of the standardised likelihood values, using the same notations as defined previously.

$$VNE_{i,j,k} = \text{Log}\left(\sum_{a \in E_{k,0}} e^{-\frac{\left(\text{Re}\left(\sum_{p=1,P}\beta_{i,j,p} \cdot zz_{i,j,p}\right) - a\right)^2}{2\left(\frac{\epsilon^2}{N}\right)_{i,j}}}\right) - \text{Log}\left(\sum_{a \in E_{k,1}} e^{-\frac{\left(\text{Re}\left(\sum_{p=1,P}\beta_{i,j,p} \cdot zz_{i,j,p}\right) - a\right)^2}{2\left(\frac{\epsilon^2}{N}\right)_{i,j}}}\right) \quad (45)$$

In the case where the modulation of the symbols is a 2-ASK, the preceding equation is simplified as follows:

$$VNE_{i,j} = 2 \cdot \text{Re}\left(\frac{\sum_{p=1,P} \beta_{i,j,p} \cdot zz_{i,j,p}}{\left(\frac{\epsilon^2}{N}\right)_{i,j}}\right) \quad (46)$$

Moreover, equation (45) can be approximated by:

$$VNE_{i,j,k} = -\frac{\min_{a \in E_{k,0}}\left[\left(\text{Re}\left(\sum_{p=1,P}\beta_{i,j,p} \cdot zz_{i,j,p}\right) - a\right)^2\right]}{2 \cdot \left(\frac{\epsilon^2}{N}\right)_{i,j}} + \frac{\min_{a \in E_{k,1}}\left[\left(\text{Re}\left(\sum_{p=1,P}\beta_{i,j,p} \cdot zz_{i,j,p}\right) - a\right)^2\right]}{2 \cdot \left(\frac{\epsilon^2}{N}\right)_{i,j}} \quad (47)$$

In an embodiment of this invention, a standardised likelihood value is obtained for bit of rank k of symbol $S_{i,j}$ according to the following equation:

$$VNE_{i,j,k} = \text{Log}\left(\sum_{a \in E_{k,0}} e^{-\frac{\left(\text{Re}\left(\sum_{p=1,P}\frac{zz_{i,j,p}}{\left(\frac{1}{\beta}\right)_{i,j,p}}\right) - a\right)^2}{2\left(\frac{\epsilon^2}{N}\right)_{i,j}}}\right) - \text{Log}\left(\sum_{a \in E_{k,1}} e^{-\frac{\left(\text{Re}\left(\sum_{p=1,P}\frac{zz_{i,j,p}}{\left(\frac{1}{\beta}\right)_{i,j,p}}\right) - a\right)^2}{2\left(\frac{\epsilon^2}{N}\right)_{i,j}}}\right) \quad (48)$$

In the case where the modulation of the symbols is a 2-ASK, the preceding equations are simplified as follows:

$$VNE_{i,j} = \frac{2}{\left(\frac{\epsilon^2}{N}\right)_{i,j}} \cdot \text{Re}\left(\sum_{p=1,P}\frac{zz_{i,j,p}}{\left(\frac{1}{\beta}\right)_{i,j,p}}\right) \quad (49)$$

Moreover, equation (48) can be approximated by:

$$VNE_{i,j,k} = \frac{\min_{a \in E_{k,0}}\left[\left(\text{Re}\left(\sum_{p=1,P}\frac{zz_{i,j,p}}{(1/\beta)_{i,j,p}}\right) - a\right)^2\right]}{2 \cdot (\epsilon^2/N)_{i,j}} + \frac{\min_{a \in E_{k,1}}\left[\left(\text{Re}\left(\sum_{p=1,P}\frac{zz_{i,j,p}}{(1/\beta)_{i,j,p}}\right) - a\right)^2\right]}{2 \cdot (\epsilon^2/N)_{i,j}} \quad (50)$$

The invention claimed is:

1. A method of signal reception in a telecommunications network comprising the reception of a number P of signals on P respective antennas, where P is an integer strictly greater than 1;

wherein said signals received corresponds to a multicarrier signal transmitted in the form of successive frames including symbols occupying respective positions distributed along an axis of time and along an axis of frequency; a frame including M blocks with each having at least N reference symbols, with the reference symbols in each of said blocks satisfying a first maximum spacing between them along the axis of time and a second maximum spacing between them along the axis of frequency respectively lower than a first value and a second value, N being an integer greater than or equal to P, M being an integer at least equal to two;

wherein said method includes the following steps:

/a/ determine, at the frame level, M groups of P weighting coefficients, each one of said M groups relating respectively to one of said M blocks of reference symbols emitted, said P coefficients of a group being respectively associated to the blocks of reference symbols which are received on the P antennas and which correspond to the block of reference symbols emitted relating to said group;

said coefficients being determined so as an error value for each one of the M blocks of reference symbols emitted is lower than a threshold value, between on one hand the reference symbols of said block emitted, and on the other hand symbols obtained using symbols received on each of the P antennas at the positions of the reference symbols corresponding to said block emitted, respectively weighted by said associated weighting coefficients;

/b/ obtain weighting coefficients applicable respectively to the signals received on the P antennas for the other symbols in the frame, by interpolating said weighing coefficient determined at step /a/;

/c/ generate a composite signal by summing up the symbols received respectively on each of the P antennas and corresponding to a same symbol emitted in the frame, each one of said symbols received being respectively weighted by the associated weighting coefficient determined in step /a/ or obtained in step /b/.

2. The method set forth in claim 1, wherein /b/ is carried out by an interpolation calculation based on the inverse values of the weighting coefficients determined in step /a/.

3. The method of reception as claimed in claim 1, wherein in step /a/, the block of symbols emitted includes reference pilot symbols known to the receiver prior to their reception and/or reference symbols obtained by a prior estimate of said reference symbols.

4. The method of reception as claimed in claim 1, wherein in step /a/, for each one of the blocks of reference symbols, the error corresponds to a quadratic error determined relatively to N symbols of the block of reference symbols and satisfy the following equation:

$$\|[Z]\cdot\vec{\beta}-\vec{S}\|^2=\epsilon^2$$

where $\vec{S}$ is a column vector having for items N of symbols $S_n$ of said block of reference symbols emitted, n being an index integer between 1 and N;

where [Z] is a matrix having for items the received symbols $Z_{n,p}$ of the frame, where n represents the line index of the matrix, n being an index integer between 1 and N, and p represents the column index of the matrix, p being an index integer between 1 and P, where $Z_{n,p}$ is the symbol received on the $p^{th}$ antenna and corresponding to the position of symbol $S_n$ of the block of reference symbols emitted; and where $\vec{\beta}$ is a column vector having for items the weighting coefficients $\beta_p$ determined in step /a/ relatively to said block of reference symbols, $\beta_p$ being the weighting coefficient corresponding to the $p^{th}$ antenna.

5. The method of reception according to claim 4, wherein the column vector of the weighting coefficients $\vec{\beta}$ satisfies the following equation:

$$\vec{\beta}[[Z]^{*T}\cdot[Z]]^{-1}[Z]^{*T}\cdot\vec{S},$$

where [Z]* represents the conjugated matrix of matrix [Z], and where $[Z]^{*T}$ represents the transposed version of matrix [Z]*.

6. The method of reception as claimed in claim 1 further comprising, when an average power value of noise pertaining to the composite signal is substantially identical on each of the antennas for each of the symbols in the signal, and when the telecommunications network is based on an OFDM-$4^n$QAM modulation represented in a complex form on a real axis and an imaginary axis, a step consisting in calculating a likelihood value of a bit carried by the real axis of the $4^n$QAM modulation, respectively carried by the imaginary axis of the $4^n$QAM modulation, said bit corresponding to the bit of rank k of a symbol of the frame, said symbol occupying a position in the frame of coordinates i and j said likelihood value $V_{i,j,R,k}$, respectively $V_{i,j,I,k}$, respectively satisfying the following equations:

$$V_{i,j,R,k} = \text{Log}\left(\sum_{a\in E_{R\,k\,0}} e^{-\frac{(\text{Re}(\sum_{p=1,P}\beta_{i\,j\,p}z_{i\,j\,p})-a)^2}{2\sum_{p=1,P}\|\beta_{i\,j\,p}\|^2}}\right) - \text{Log}\left(\sum_{a\in E_{R\,k\,1}} e^{-\frac{(\text{Re}(\sum_{p=1,P}\beta_{i\,j\,p}z_{i\,j\,p})-a)^2}{2\sum_{p=1,P}\|\beta_{i\,j\,p}\|^2}}\right)$$

$$V_{i,j,I,k} = \text{Log}\left(\sum_{a\in E_{I\,k\,0}} e^{-\frac{(\text{Im}(\sum_{p=1,P}\beta_{i\,j\,p}z_{i\,j\,p})-a)^2}{2\sum_{p=1,P}\|\beta_{i\,j\,p}\|^2}}\right) - \text{Log}\left(\sum_{a\in E_{I\,k\,1}} e^{-\frac{(\text{Im}(\sum_{p=1,P}\beta_{i\,j\,p}z_{i\,j\,p})-a)^2}{2\sum_{p=1,P}\|\beta_{i\,j\,p}\|^2}}\right)$$

where $\beta_{i,j,p}$ is the weighting coefficient assigned to symbol $Z_{i,j,p}$, received on the $p^{th}$ antenna and corresponding to symbol $S_{i,j}$ of the frame emitted;

where $E_{R,k,0}$ corresponds to a set of amplitude values a taken by the $4^n$QAM modulation along the real axis which correspond to symbols emitted for which the bit carried by the real axis of the modulation and of rank k takes the value 0;

where $E_{R,k,1}$ corresponds to a set of amplitude values a taken by the modulation $4^n$QAM along the real axis which corresponds to symbols emitted for which the bit carried by the real axis of the modulation and of rank k takes the value 1;

where $E_{I,k,0}$ corresponds to a set of amplitude values a taken by the modulation $4^n$QAM along the imaginary axis which correspond to symbols emitted for which the bit carried by the imaginary axis of the modulation and of rank k takes the value 0; and where $E_{I,k,1}$ corresponds to a set of amplitude values a taken by the modulation $4^n$QAM along the imaginary axis which correspond to symbols emitted for which the bit carried by the imaginary axis of the modulation and of rank k takes the value 1.

7. The method of reception as claimed in claim 1 further comprising, when an average power value of noise pertaining to the composite signal is substantially identical on each of the antennas for each of the symbols of the signal, and when the telecommunications network is based on an OFDM-$4^n$QAM modulation represented in a complex form on a real axis and an imaginary axis, a step consisting in calculating a likelihood value for a bit carried by the real axis of the $4^n$QAM modulation, respectively carried by the imaginary axis of the $4^n$QAM modulation, said bit corresponding to the bit of rank k of a symbol of the frame, said symbol occupying a position in the frame of coordinates i and j said likelihood value $V_{i,j,R,k}$, respectively $V_{i,j,I}$, respectively satisfying the following equations:

$$V_{i\,j\,R\,k} = -\frac{\underset{a \in E_{R\,k\,0}}{\text{Min}}\left[\left(\text{Re}\left(\sum_{p=1,P}\beta_{i\,j\,p}z_{i\,j,p}\right)-a\right)^2\right]}{2 \cdot \sum_{p=1,P}\|\beta_{i\,j\,p}\|^2} +$$

$$\frac{\underset{a \in E_{R\,k\,1}}{\text{Min}}\left[\left(\text{Re}\left(\sum_{p=1,P}\beta_{i\,j\,p}z_{i\,j\,p}\right)-a\right)^2\right]}{2 \cdot \sum_{p=1,P}\|\beta_{i\,j\,p}\|^2}$$

$$V_{i,j,I\,k} = -\frac{\underset{a \in E_{I\,k\,0}}{\text{Min}}\left[\left(\text{Im}\left(\sum_{p=1,P}\beta_{i\,j\,p}z_{i,j,p}\right)-a\right)^2\right]}{2 \cdot \sum_{p=1,P}\|\beta_{i,j\,p}\|^2} +$$

$$\frac{\underset{a \in E_{I\,k\,1}}{\text{Min}}\left[\left(\text{Im}\left(\sum_{p=1,P}\beta_{i,j\,p}z_{i,j\,p}\right)-a\right)^2\right]}{2 \cdot \sum_{p=1,P}\|\beta_{i\,j\,p}\|^2}$$

where $\beta_{i,j,p}$ is the weighting coefficient assigned to symbol $Z_{i,j,p}$, received on the $p^{th}$ antenna and corresponding to symbol $S_{i,j}$ of the frame emitted;

where $E_{R,k,0}$ corresponds to a set of amplitude values a taken by the $4^n$QAM modulation along the real axis which correspond to symbols emitted for which the bit carried by the real axis of the modulation and of rank k takes the value 0;

where $E_{R,k,1}$ corresponds to a set of amplitude values a taken by the $4^n$QAM modulation along the real axis which correspond to symbols emitted for which the bit carried by the real axis of the modulation and of rank k takes the value 1;

where $E_{I,k,0}$ corresponds to a set of amplitude values a taken by the modulation $4^n$QAM along the imaginary axis which correspond to symbols emitted for which the bit carried by the imaginary axis of the modulation and of rank k takes the value 0; and where $E_{I,k,1}$ corresponds to a set of amplitude values a taken by the modulation $4^n$QAM along the imaginary axis which correspond to symbols emitted for which the bit carried by the imaginary axis of the modulation and of rank k takes the value 1.

8. The method of reception as claimed in claim 1, wherein an average power value of noise, $\overline{e}^2$, relative to the composite signal is substantially identical for each of the symbols in the signal;

wherein the telecommunications network is based on an OFDM-$4^n$QAM modulation represented in a complex form on a real axis and an imaginary axis;

and wherein said method further comprises a step consisting in calculating a likelihood value of a bit carried by the real axis of the $4^n$QAM modulation, respectively carried by the imaginary axis of the $4^n$QAM modulation, said bit corresponding to the bit of rank k of a symbol of the frame, said symbol occupying a position in the frame of coordinates i and j said likelihood value $V_{i,j,R,k}$, respectively $V_{i,j,I,k}$, respectively satisfying the following equations:

$$VN_{i\,j\,R,k} = \text{Log}\left(\sum_{a \in E_{R\,k\,0}} e^{-\frac{\left(\text{Re}\left(\sum_{p=1,P}\beta_{i\,j\,p}z_{i\,j\,p}\right)-a\right)^2}{2\overline{e}^2}}\right) -$$

$$\text{Log}\left(\sum_{a \in E_{R,k\,1}} e^{-\frac{\left(\text{Re}\left(\sum_{p=1,P}\beta_{i\,j\,p}z_{i\,j\,p}\right)-a\right)^2}{2\overline{e}^2}}\right)$$

and $$VN_{i,j,I,k} = \text{Log}\left(\sum_{a \in E_{I\,k\,0}} e^{-\frac{\left(\text{Im}\left(\sum_{p=1,P}\beta_{i\,j,p}z_{i,j,p}\right)-a\right)^2}{2\cdot\overline{e}^2}}\right) -$$

$$\text{Log}\left(\sum_{a \in E_{I,k\,1}} e^{-\frac{\left(\text{Im}\left(\sum_{p=1,P}\beta_{i\,j,p}z_{i,j,p}\right)-a\right)^2}{2\cdot\overline{e}^2}}\right)$$

where $\overline{e}^2$ corresponds to an average power value of noise determined relatively to a frame preceding the given frame, using an error between the symbols of the composite signal generated for said preceding frame and corresponding estimated symbols;

where $\beta_{i,j,p}$ is the weighting coefficient assigned to symbol $Z_{i,j,p}$, received on the $p^{th}$ antenna and corresponding to symbol $S_{i,j}$ of the frame emitted;

where $E_{R,k,0}$ corresponds to a set of amplitude values taken by the $4^n$QAM modulation along the real axis which correspond to symbols emitted for which the bit carried by the real axis of the modulation and of rank k takes the value 0;

where $E_{R,k,1}$ corresponds to a set of amplitude values a taken by the $4^n$QAM modulation along the real axis which correspond to symbols emitted for which the bit carried by the real axis of the modulation and of rank k takes the value 1;

where $E_{I,k,0}$ corresponds to a set of amplitude values a taken by the modulation $4^n$QAM along the imaginary axis which correspond to symbols emitted for which the bit carried by the imaginary axis of the modulation and of rank k takes the value 0; and where $E_{I,k,1}$ corresponds to a set of amplitude values a taken by the modulation $4^n$QAM along the imaginary axis which correspond to symbols emitted for which the bit carried by the imaginary axis of the modulation and of rank k takes the value 1.

9. The method of reception as claimed in claim 1, wherein an average power value of noise, $\overline{e}^2$, relative to the composite signal is substantially identical for each of the symbols in the signal;

wherein the telecommunications network is based on an OFDM-$4^n$QAM modulation represented in a complex form on a real axis and an imaginary axis;

wherein said method further comprises a step consisting in calculating a likelihood value of a bit carried by the real axis of the $4^n$QAM modulation, respectively carried by the imaginary axis of the $4^n$QAM modulation, and of rank k of a symbol of the frame, said symbol occupying a position in the frame of coordinates i and j said likelihood value $V_{i,j,R,k}$, respectively $V_{i,j,I,k}$, respectively satisfying the following equations:

$$VN_{i,j,R,k} = -\frac{\underset{a \in E_{R,k,0}}{\text{Min}}\left[\left(\text{Re}\left(\sum_{p=1,P}\beta_{i,j,p}z_{i,j,p}\right)-a\right)^2\right]}{2\cdot\overline{e}^2} +$$

$$\frac{\underset{a \in E_{R,k,1}}{\text{Min}}\left[\left(\text{Re}\left(\sum_{p=1,P}\beta_{i,j,p}z_{i,j,p}\right)-a\right)^2\right]}{2\cdot\overline{e}^2}$$

and:

$$VN_{i,j,I,k} = -\frac{\underset{a \in E_{I,k,0}}{\text{Min}}\left[\left(\text{Im}\left(\sum_{p=1,P}\beta_{i,j,p}z_{i,j,p}\right)-a\right)^2\right]}{2\cdot\overline{e}^2} +$$

$$\frac{\underset{a \in E_{I,k,1}}{\text{Min}}\left[\left(\text{Im}\left(\sum_{p=1,P}\beta_{i,j,p}z_{i,j,p}\right)-a\right)^2\right]}{2\cdot\overline{e}^2}$$

where $\overline{e}^2$ corresponds to an average power value of noise determined relatively to a frame preceding the given frame, using an error between the symbols of the composite signal generated for said preceding frame and corresponding estimated symbols;

where $\beta_{i,j,p}$ is the weighting coefficient assigned to symbol $Z_{i,j,p}$, received on the $p^{th}$ antenna and corresponding to symbol $S_{i,j}$ of the frame emitted;

where $E_{R,k,0}$ corresponds to a set of amplitude values taken by the $4^n$QAM modulation along the real axis which correspond to symbols emitted for which the bit carried by the real axis of the modulation and of rank k takes the value 0;

where $E_{R,k,1}$ corresponds to a set of amplitude values a taken by the $4^n$QAM modulation along the real axis which correspond to symbols emitted for which the bit carried by the real axis of the modulation and of rank k takes the value 1;

where $E_{I,k,0}$ corresponds to a set of amplitude values a taken by the modulation $4^n$QAM along the imaginary axis which correspond to symbols emitted for which the bit carried by the imaginary axis of the modulation and of rank k takes the value 0; and where $E_{I,k,1}$ corresponds to a set of amplitude values a taken by the modulation $4^n$QAM along the imaginary axis which correspond to symbols emitted for which the bit carried by the imaginary axis of the modulation and of rank k takes the value 1.

10. The method of reception according to claim 4, wherein the telecommunications network is based on an OFDM-$4^n$QAM modulation represented in a complex form on a real axis and an imaginary axis;

wherein said method further comprises a step consisting in calculating a likelihood value for a bit carried by the real axis of the $4^n$QAM modulation, respectively carried by the imaginary axis of the $4^n$QAM modulation, said bit corresponding to the bit of rank k of a symbol of the frame, said symbol occupying a position in the frame of coordinates i and j said likelihood value $V_{i,j,R,k}$, respectively $V_{i,j,I,k}$, respectively satisfying the following equations:

$$VNE_{i,j,R,k} = \text{Log}\left(\sum_{a \in E_{R,k,0}} e^{-\frac{\left(\text{Re}\left(\sum_{p=1,P}\beta_{i,j,p}z_{i,j,p}\right)-a\right)^2}{2(\epsilon^2/N)_{i,j}}}\right) -$$

$$\text{Log}\left(\sum_{a \in E_{R,k,1}} e^{-\frac{\left(\text{Re}\left(\sum_{p=1,P}\beta_{i,j,p}z_{i,j,p}\right)-a\right)^2}{2(\epsilon^2/N)_{i,j}}}\right)$$

and:

$$VNE_{i,j,I,k} = \text{Log}\left(\sum_{a \in E_{I,k,0}} e^{-\frac{\left(\text{Im}\left(\sum_{p=1,P}\beta_{i,j,p}z_{i,j,p}\right)-a\right)^2}{2(\epsilon^2/N)_{i,j}}}\right) -$$

$$\text{Log}\left(\sum_{a \in E_{I,k,1}} e^{-\frac{\left(\text{Im}\left(\sum_{p=1,P}\beta_{i,j,p}z_{i,j,p}\right)-a\right)^2}{2(\epsilon^2/N)_{i,j}}}\right)$$

where $(\epsilon^2/N)_{i,j}$ corresponds to an average power value of noise relative to the composite symbol $Z'_{i,j}$ of the composite signal, and is obtained using average power values relative to the blocks of reference symbols of the frame by dividing the value of the quadratic error $\epsilon^2$ by the number N of symbol of said block of reference symbols; and where N is a number greater than or equal to P+1;

where $\beta_{i,j,p}$ is the weighting coefficient assigned to symbol $Z_{i,j,p}$, received on the $p^{th}$ antenna and corresponding to symbol $S_{i,j}$ of the frame emitted;

where $E_{R,k,0}$ corresponds to a set of amplitude values a taken by the $4^n$QAM modulation along the real axis which correspond to symbols emitted for which the bit carried by the real axis of the modulation and of rank k takes the value 0;

where $E_{R,k,1}$ corresponds to a set of amplitude values a taken by the $4^n$QAM modulation along the real axis which correspond to symbols emitted for which the bit carried by the real axis of the modulation and of rank k takes the value 1;

where $E_{I,k,0}$ corresponds to a set of amplitude values a taken by the modulation $4^n$QAM along the imaginary axis which correspond to symbols emitted for which the bit carried by the imaginary axis of the modulation and of rank k takes the value 0; and where $E_{I,k,1}$ corresponds to a set of amplitude values a taken by the modulation $4^n$QAM along the imaginary axis which correspond to symbols emitted for which the bit carried by the imaginary axis of the modulation and of rank k takes the value 1.

11. The method of reception according to claim 4 wherein the telecommunications network is based on an OFDM-$4^n$QAM modulation represented in a complex form on a real axis and an imaginary axis;

wherein said method further comprises a step consisting in calculating a likelihood value of a bit carried by the real axis of the $4^n$QAM modulation, respectively carried by the imaginary axis of the $4^n$QAM modulation, and of rank k of a symbol of the frame, said symbol occupying a position in the frame of coordinates i and j said likelihood value $V_{i,j,R,k}$, respectively $V_{i,j,I,k}$, respectively satisfying the following equations:

$$VNE_{i,j\,R\,k} = \frac{\underset{a \in E_{R,k,0}}{\text{Min}}\left[\left(\text{Re}\left(\sum_{p=1,P}\beta_{i\,j\,p}z_{i\,j,p}\right) - a\right)^2\right]}{2 \cdot (\varepsilon^2/N)_{i,j}} +$$

$$\frac{\underset{a \in E_{R,k,1}}{\text{Min}}\left[\left(\text{Re}\left(\sum_{p=1,P}\beta_{i\,j\,p}z_{i\,j,p}\right) - a\right)^2\right]}{2 \cdot (\varepsilon^2/N)_{i,j}}$$

and:

$$VNE_{i,j\,I\,k} = \frac{\underset{a \in E_{R,k,0}}{\text{Min}}\left[\left(\text{Im}\left(\sum_{p=1,P}\beta_{i\,j\,p}z_{i\,j,p}\right) - a\right)^2\right]}{2 \cdot (\varepsilon^2/N)_{i,j}} +$$

$$\frac{\underset{a \in E_{R,k,1}}{\text{Min}}\left[\left(\text{Im}\left(\sum_{p=1,P}\beta_{i\,j\,p}z_{i\,j,p}\right) - a\right)^2\right]}{2 \cdot (\varepsilon^2/N)_{i,j}}$$

where $(\varepsilon^2/N)_{i,j}$ corresponds to a power value of noise relative to the composite symbol $Z'_{i,j}$ of the composite signal and is obtained using average power values relative to each one of the blocks of reference symbols of the frame by dividing the value of the quadratic error $\varepsilon^2$ by the number N of symbol of said block of reference symbols; and where N is a number greater than or equal to P+1;

where $\beta_{i,j,p}$ is the weighting coefficient assigned to symbol $Z_{i,j,p}$, received on the $p^{th}$ antenna and corresponding to symbol $S_{i,j}$ of the frame emitted;

where $E_{R,k,0}$ corresponds to a set of amplitude values a taken by the $4^n$QAM modulation along the real axis which correspond to symbols emitted for which the bit carried by the real axis of the modulation and of rank k takes the value 0;

where $E_{R,k,1}$ corresponds to a set of amplitude values taken by the $4^n$QAM modulation along the real axis which correspond to symbols emitted for which the bit carried by the real axis of the modulation and of rank k takes the value 1;

where $E_{I,k,0}$ corresponds to a set of amplitude values a taken by the modulation $4^n$QAM along the imaginary axis which correspond to symbols emitted for which the bit carried by the imaginary axis of the modulation and of rank k takes the value 0; and where $E_{I,k,1}$ corresponds to a set of amplitude values a taken by the modulation $4^n$QAM along the imaginary axis which correspond to symbols emitted for which the bit carried by the imaginary axis of the modulation and of rank k takes the value 1.

12. The method of reception as claimed in claim 10, wherein the average power values $(\varepsilon^2/N)_{i,j}$ are determined on the basis of an interpolation calculation of the average power values $(\varepsilon^2/N)$ relative to the blocks of reference symbols of the frame.

13. The method of reception as claimed in claim 1, wherein the signal received is a multicarrier signal, of the OFDM/IOTA or OFDM/OQAM type, according to which in step /a/, for each one of the blocks of reference symbols, the error corresponds to a quadratic error determined relatively to N symbols of the block of reference symbols and satisfies the following equation:

$$\|Re([ZZ]\cdot\vec{\beta}) - \vec{SS}\|^2 = \varepsilon^2$$

where $\vec{SS}$ is a column vector having for items N of symbols $SS_n$ deduced from reference symbols $S_n$ of said block of symbols emitted, n being an index integer between 1 and N, where $SS_n$ is obtained by transformation of the reference symbol $S_n$ of the block of reference symbols emitted, said transformation being defined according to the following two rules:

$SS_n = S_n$; if the reference symbol $S_n$ is purely real;

$SS_n = -j \cdot S_n$; if the reference symbol $S_n$ is purely imaginary, j being the square root of −1, and where [ZZ] is a matrix having for items symbols $ZZ_{n,p}$ of the frame received, where n represents the line index of the matrix, n being an index integer between 1 and N and p representing the column index of the matrix, p being an index integer between 1 and P, where $ZZ_{n,p}$ is obtained by transformation of the symbol received $Z_{n,p}$ on the $p^{th}$ antenna and corresponding to the position of symbol $S_n$ of the block of reference symbols emitted, said transformation being defined according to the following two rules:

$ZZ_{i,j} = Z_{i,j}$; if the corresponding transmitted symbol $S_{i,j}$ is purely real;

$ZZ_{i,j} = -j \cdot Z_{i,j}$; if the corresponding transmitted symbol $S_{i,j}$ is purely imaginary; and where $\vec{\beta}$ is a column vector having for items weighting coefficients $\beta_p$ determined in step /a/ relatively to said block of symbols, $\beta_p$ being the weighting coefficient corresponding to the $p^{th}$ antenna.

14. The method of reception according to claim 13 wherein the column vector of the weighting coefficients $\vec{\beta}$ satisfies the following equation:

$$\begin{bmatrix} \text{Re}(\vec{\beta}) \\ \text{Im}(\vec{\beta}) \end{bmatrix} = M \begin{bmatrix} \text{Re}([ZZ]^{*T} \cdot \vec{SS}) \\ \text{Im}([ZZ]^{*T} \cdot \vec{SS}) \end{bmatrix}$$

where M is a matrix defined by blocks according to the following equation:

$$M = \begin{bmatrix} \|\text{Re}([ZZ])\|^2 & -\text{Re}([ZZ])^T \cdot \text{Im}([ZZ]) \\ -\text{Im}([ZZ]^T) \cdot \text{Re}([ZZ]) & \|\text{Im}([ZZ])\|^2 \end{bmatrix}^{-1}$$

15. The method set forth in claim 13, further comprising, when an average power value of noise relative to the composite signal is substantially identical on each of the antennas for each of the symbols in the signal and when the telecommunications network is based on an OFDM/IOTA or OFDM/OQAM system using symbols modulated with a $2^n$ASK modulation, a step consisting in calculating a likelihood value of a bit carried by the $2^n$ASK modulation said bit corresponding to the bit of rank k of a symbol of the frame, said symbol occupying a position in the frame of coordinates i and j, said likelihood value $V_{i,j,k}$, satisfying the following equation:

$$V_{i\ j\ k} = \text{Log}\left(\sum_{a \in E_{k\ 0}} e^{-\frac{(\text{Re}(\sum_{p=1,P} \beta_{i\ j\ p} \cdot zz_{i\ j\ p}) - a)^2}{2 \cdot \sum_{p=1,P} \|\beta_{i\ j\ p}\|^2}}\right) -$$

$$\text{Log}\left(\sum_{a \in E_{k\ 1}} e^{-\frac{(\text{Re}(\sum_{p=1,P} \beta_{i\ j\ p} \cdot zz_{i\ j\ p}) - a)^2}{2 \cdot \sum_{p=1,P} \|\beta_{i\ j\ p}\|^2}}\right)$$

where $\beta_{i,j,p}$ is the weighting coefficient assigned to received symbol $Z_{i,j,p}$, received on the $p^{th}$ antenna and corresponding to symbol $S_{i,j}$ of the frame emitted;

where $E_{k,0}$ corresponds to a set of amplitude values a taken by the $2^n$ASK modulation which correspond to symbols emitted for which the bit carried by the axis of the modulation and of rank k takes the value 0;

where $E_{k,1}$ corresponds to a set of amplitude values a taken by the $2^n$ASK modulation which correspond to symbols emitted for which the bit carried by the axis of the modulation and of rank k takes the value 1.

16. The method set forth in claim 13, further comprising, when an average power value of noise relative to the composite signal is substantially identical on each of the antennas for each of the symbols in the signal and when the telecommunications network is based on an OFDM/IOTA or OFDM/OQAM system using symbols modulated with a $2^n$ASK modulation, a step consisting in calculating a likelihood value of a bit carried by the $2^n$ASK modulation said bit corresponding to the bit of rank k of a symbol of the frame, said symbol occupying a position in the frame of coordinates i and j, said likelihood value $V_{i,j,k}$, satisfying the following equation:

$$V_{i\ j\ k} = -\frac{\underset{a \in E_{k\ 0}}{\text{Min}}\left(\text{Re}\left(\sum_{p=1,P} \beta_{i\ j\ p} \cdot zz_{i\ j\ p}\right) - a\right)^2}{2 \cdot \sum_{p=1,P} \|\beta_{i\ j\ p}\|^2} +$$

$$\frac{\underset{a \in E_{k\ 1}}{\text{Min}}\left(\text{Re}\left(\sum_{p=1,P} \beta_{i\ j\ p} \cdot zz_{i\ j\ p}\right) - a\right)^2}{2 \cdot \sum_{p=1,P} \|\beta_{i\ j\ p}\|^2}$$

where $\beta_{i,j,p}$ is the weighting coefficient assigned to received symbol $Z_{i,j,p}$, received on the $p^{th}$ antenna and corresponding to symbol $S_{i,j}$ of the frame emitted;

where $E_{k,0}$ corresponds to a set of amplitude values a taken by the $2^n$ASK modulation which corresponds to symbols emitted for which the bit carried by the axis of the modulation and of rank k takes the value 0;

where $E_{k,1}$ corresponds to a set of amplitude values a taken by the $2^n$ASK modulation which corresponds to symbols emitted for which the bit carried by the axis of the modulation and of rank k takes the value 1.

17. The method of reception as claimed in claim 13, comprising, when an average power value of noise, $\overline{e}^2$, relative to the composite signal is substantially identical on each of the antennas for each of the symbols of the signal and when the telecommunications network is based on an OFDM/IOTA or OFDM/OQAM system using symbols modulated with a $2^n$ ASK modulation;

a step consisting in calculating a likelihood value of a bit carried by the $2^n$ASK modulation said bit corresponding to the bit of rank k of a symbol of the frame, said symbol occupying a position in the frame of coordinates i and j, said likelihood value $V_{i,j,k}$, satisfying the following equation:

$$VN_{i\ j\ k} = \text{Log}\left(\sum_{a \in E_{k\ 0}} e^{-\frac{(\text{Re}(\sum_{p=1,P} \beta_{i\ j\ p} \cdot zz_{i\ j\ p}) - a)^2}{2e^2}}\right) -$$

$$\text{Log}\left(\sum_{a \in E_{k\ 01}} e^{-\frac{(\text{Re}(\sum_{p=1,P} \beta_{i\ j\ p} \cdot zz_{i\ j\ p}) - a)^2}{2e^2}}\right)$$

where $\overline{e}^2$ corresponds to an estimated average power value of noise relatively to a frame preceding the given frame, using an error between the symbols of the composite signal generated for said preceding frame and symbols estimated on each antenna according to a channel estimation method;

where $\beta_{i,j,p}$ is the weighting coefficient assigned to received symbol $Z_{i,j,p}$, received on the $p^{th}$ antenna and corresponding to symbol $S_{i,j}$ of the frame emitted;

where $E_{k,0}$ corresponds to a set of amplitude values a taken by the $2^n$ASK modulation which correspond to symbols emitted for which the bit carried by the axis of the modulation and of rank k takes the value 0;

where $E_{k,1}$ corresponds to a set of amplitude values a taken by the $2^n$ASK modulation which correspond to symbols emitted for which the bit carried by the axis of the modulation and of rank k takes the value 1.

18. The method of reception as claimed in claim 13, comprising, when an average power value of noise, $\vec{e}^2$, relative to the composite signal is substantially identical on each of the antennas for each of the symbols in the signal and when the telecommunications network is based on an OFDM/IOTA or OFDM/OQAM system using symbols modulated with a $2^n$ASK modulation;

a step consisting in calculating a likelihood value of a bit carried by the $2^n$ASK modulation said bit corresponding to the bit of rank k of a symbol of the frame, said symbol occupying a position in the frame of coordinates i and j, said likelihood value $V_{i,j,k}$, satisfying the following equation:

$$VN_{i,j,k} = -\frac{\underset{a \in E_{k\ 0}}{\text{Min}}\left[\left(\text{Re}\left(\sum_{p=1,P} \beta_{i,j,p} \cdot zz_{i,j,p}\right) - a\right)^2\right]}{2 \cdot \overline{e}^2} +$$

$$\frac{\underset{a \in E_{k\ 1}}{\text{Min}}\left[\left(\text{Re}\left(\sum_{p=1,P} \beta_{i,j,p} \cdot zz_{i,j,p}\right) - a\right)^2\right]}{2 \cdot \overline{e}^2}$$

where $\vec{e}^2$ corresponds to an estimated average power value of noise relatively to a frame preceding the given frame, using an error between the symbols of the composite signal generated for said preceding frame and symbols estimated on each antenna according to a channel estimation method;

where $\beta_{i,j,p}$ is the weighting coefficient assigned to received symbol $Z_{i,j,p}$, received on the $p^{th}$ antenna and corresponding to symbol $S_{i,j}$ of the frame emitted;

where $E_{k,0}$ corresponds to a set of amplitude values a taken by the $2^n$ASK modulation which correspond to symbols emitted for which the bit carried by the axis of the modulation and of rank k takes the value 0;

where $E_{k,1}$ corresponds to a set of amplitude values a taken by the $2^n$ASK modulation which correspond to symbols emitted for which the bit carried by the axis of the modulation and of rank k takes the value 1.

19. The method of reception according to claim 13, comprising when the telecommunications network is based on an OFDM/IOTA or OFDM/OQAM system using symbols modulated with a $2^n$ASK modulation;

a step consisting in calculating a likelihood value of a bit carried by the $2^n$ASK modulation said bit corresponding to the bit of rank k of a symbol of the frame, said symbol occupying a position in the frame of coordinates i and j, said likelihood value $V_{i,j,k}$, satisfying the following equation:

$$VNE_{i,j,k} = \text{Log}\left(\sum_{a \in E_{k\,0}} e^{-\frac{\left(\text{Re}\left(\sum_{p=1,P} \beta_{i,j,p} \cdot zz_{i,j,p}\right) - a\right)^2}{2 \cdot (\varepsilon^2/N)_{i,j}}}\right) -$$

$$\text{Log}\left(\sum_{a \in E_{k\,1}} e^{-\frac{\left(\text{Re}\left(\sum_{p=1,P} \beta_{i,j,p} \cdot zz_{i,j,p}\right) - a\right)^2}{2 \cdot (\varepsilon^2/N)_{i,j}}}\right)$$

where $(\varepsilon^2/N)_{i,j}$ corresponds to a power value of noise relative to the composite symbol $ZZ_{i,j}$ of the composite signal and obtained using average power values $(\varepsilon^2/N)$ relative to the blocks of symbols; and where N is a number greater than or equal to P+1;

where $\beta_{i,j,p}$ is the weighting coefficient assigned to received symbol $Z_{i,j,p}$, received on the $p^{th}$ antenna and corresponding to symbol $S_{i,j}$ of the frame emitted;

where $E_{k,0}$ corresponds to a set of amplitude values a taken by the $2^n$ASK modulation which correspond to symbols emitted for which the bit carried by the axis of the modulation and of rank k takes the value 0;

where $E_{k,1}$ corresponds to a set of amplitude values a taken by the $2^n$ASK modulation which correspond to symbols emitted for which the bit carried by the axis of the modulation and of rank k takes the value 1.

20. The method of reception according to claim 13, comprising when the telecommunications network is based on an OFDM/IOTA or OFDM/OQAM system using symbols modulated with a $2^n$ASK modulation;

a step consisting in calculating a likelihood value of a bit carried by the $2^n$ASK modulation said bit corresponding to the bit of rank k of a symbol of the frame, said symbol occupying a position in the frame of coordinates i and j, said likelihood value $V_{i,j,k}$, satisfying the following equation:

$$VNE_{i,j,k} = -\frac{\underset{a \in E_{k\,0}}{\text{Min}}\left[\left(\text{Re}\left(\sum_{p=1,P} \beta_{i,j,p} \cdot zz_{i,j,p}\right) - a\right)^2\right]}{2 \cdot (\varepsilon^2/N)_{i,j}} +$$

$$\frac{\underset{a \in E_{k\,1}}{\text{Min}}\left[\left(\text{Re}\left(\sum_{p=1,P} \beta_{i,j,p} \cdot zz_{i,j,p}\right) - a\right)^2\right]}{2 \cdot (\varepsilon^2/N)_{i,j}}$$

where $(\varepsilon^2/N)_{i,j}$ corresponds to a power value of noise relative to the composite symbol $ZZ_{i,j}$ of the composite signal and obtained using average power values $(\varepsilon^2/N)$ relative to the blocks of symbols; and where N is a number greater than or equal to P+1;

where $\beta_{i,j,p}$ is the weighting coefficient assigned to received symbol $Z_{i,j,p}$, received on the $p^{th}$ antenna and corresponding to symbol $S_{i,j}$ of the frame emitted;

where $E_{k,0}$ corresponds to a set of amplitude values a taken by the $2^n$ ASK modulation which correspond to symbols emitted for which the bit carried by the axis of the modulation and of rank k takes the value 0;

where $E_{k,1}$ corresponds to a set of amplitude values a taken by the $2^n$ ASK modulation which correspond to symbols emitted for which the bit carried by the axis of the modulation and of rank k takes the value 1.

21. The method set forth in claim 20, wherein the average power values $(\varepsilon^2/N)_{i,j}$ are determined on the basis of an interpolation calculation of the average power values $(\varepsilon^2/N)$ relative to the blocks of symbols of the frame.

22. A reception device for the implementation of a method as claimed in claim 1, wherein:

a reception unit comprising P antennas, each one being adapted to receive a give, frame of a signal emitted in the network;

a determination unit adapted to determine at the frame level, M groups of P weighting coefficients, each one of said M groups relating respectively to one of said M blocks of reference symbols emitted, said P coefficients of a group being respectively associated to the blocks of reference symbols that are received on the P antennas and which correspond to the block of reference symbols emitted relating to said group; said coefficients being determined so as to increase via a threshold value, an error value for each one of the M blocks of reference symbols emitted, between on one hand the reference symbols of said block emitted, and on the other hand symbols obtained using symbols received on each of the P antennas at the positions of the reference symbols corresponding to said block emitted, respectively weighted by said associated weighting coefficients;

an obtaining unit adapted to obtain weighting coefficients applicable respectively to the signals received on the P antennas for the other symbols of the frame by interpoling said weighting coefficients determined by the determination unit;

a generation unit of a composite signal adapted to sum up the symbols received respectively on each of the P antennas and corresponding to a same symbol emitted in the frame, each one of said symbols received being respectively weighted by the associated weighting coefficient provided by the determination unit or the obtaining unit.

23. A telecommunications system comprised of:

a transmission device adapted to emit a multicarrier signal transmitted in the form of successive frames including symbols occupying respective positions distributed along an axis of time and along an axis of frequency; a frame comprised of M blocks each having at least N reference symbols, with the reference symbols in each of said blocks satisfying a first maximum spacing between them along the axis of time and a second maximum spacing between them along the axis of frequency respectively lower than a first and a second value, M being an integer at least equal to two; and a receiving device set forth in claim 22.

\* \* \* \* \*